United States Patent
Yamashita et al.

(10) Patent No.: US 9,988,050 B2
(45) Date of Patent: Jun. 5, 2018

(54) VEHICLE CONTROL DEVICE

(71) Applicant: TOYOTA JIDOSHA KABUSHIKI KAISHA, Toyota-shi, Aichi (JP)

(72) Inventors: Keiji Yamashita, Seto (JP); Tetsuya Taira, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/356,068

(22) Filed: Nov. 18, 2016

(65) Prior Publication Data

US 2017/0144664 A1   May 25, 2017

(30) Foreign Application Priority Data

Nov. 19, 2015   (JP) .................. 2015-226400

(51) Int. Cl.
*B60W 30/14* (2006.01)
*B60W 10/04* (2006.01)
(Continued)

(52) U.S. Cl.
CPC .......... *B60W 30/146* (2013.01); *B60W 10/04* (2013.01); *B60W 10/18* (2013.01); *B60W 30/18* (2013.01); *B60W 50/12* (2013.01); *B60W 50/14* (2013.01); *B60K 2031/0091* (2013.01); *B60K 2310/244* (2013.01);
(Continued)

(58) Field of Classification Search
CPC .... B60W 30/146; B60W 50/12; B60W 50/14; B60W 2050/0014; B60W 2520/10; B60W 2550/22; B60K 2031/0091; B60K 2310/244
See application file for complete search history.

(56) References Cited

U.S. PATENT DOCUMENTS

2006/0225936 A1* 10/2006 Kawazoe .................. B60T 7/16
                                                              180/167
2009/0240413 A1*  9/2009 Miyajima ......... B60W 50/0098
                                                              701/70
(Continued)

FOREIGN PATENT DOCUMENTS

DE   102013216705 A1   3/2014
JP   2005-128790 A     5/2005
(Continued)

OTHER PUBLICATIONS

Mar. 8, 2017 Extended Search Report issued in European Patent Application No. 16199609.5.

*Primary Examiner* — Michael J Zanelli
(74) *Attorney, Agent, or Firm* — Oliff PLC

(57) ABSTRACT

A vehicle control device which can substantially eliminate or shorten a period when vehicle speed exceeds a lowered speed limit when a vehicle goes into a road where a speed limit lower than before then during running of the vehicle should be provided. A speed control decreases vehicle speed so that the vehicle speed approaches the next speed limit from a time point when it is judged that a position of the own-vehicle is at a predetermined position in front of a transition point which is a point where the next speed limit starts to be applied, in a case where a specified condition that the next speed limit is lower than the present speed limit is satisfied.

10 Claims, 14 Drawing Sheets

(51) Int. Cl.
*B60W 50/12* (2012.01)
*B60K 31/00* (2006.01)
*B60W 10/18* (2012.01)
*B60W 30/18* (2012.01)
*B60W 50/14* (2012.01)
*B60W 50/00* (2006.01)

(52) U.S. Cl.
CPC . *B60W 2050/0014* (2013.01); *B60W 2520/10* (2013.01); *B60W 2550/22* (2013.01); *B60W 2550/30* (2013.01); *B60W 2720/10* (2013.01); *B60W 2720/103* (2013.01)

(56) References Cited

U.S. PATENT DOCUMENTS

| | | | |
|---|---|---|---|
| 2010/0161195 A1* | 6/2010 | Shin | B60W 10/06 701/93 |
| 2012/0245756 A1* | 9/2012 | Cooprider | B60W 30/146 701/1 |
| 2012/0253628 A1* | 10/2012 | Maruyama | B60W 50/085 701/93 |
| 2013/0113633 A1* | 5/2013 | Pilutti | G08G 1/096716 340/905 |
| 2014/0067226 A1 | 3/2014 | Lee et al. | |
| 2014/0088849 A1* | 3/2014 | Ham | B60W 30/143 701/70 |
| 2017/0015319 A1* | 1/2017 | Knoller | B60W 30/146 |
| 2017/0015320 A1* | 1/2017 | Knoller | B60W 50/14 |

FOREIGN PATENT DOCUMENTS

| | | |
|---|---|---|
| JP | 2006-035951 A | 2/2006 |
| JP | 2007-221889 A | 8/2007 |
| JP | 2008-298547 A | 12/2008 |
| JP | 2009-184464 A | 8/2009 |
| JP | 2011-510855 A | 4/2011 |
| JP | 2012-224247 A | 11/2012 |
| JP | 2012-248111 A | 12/2012 |
| WO | WO2009/096882 A1 * | 8/2009 |

* cited by examiner (A)

(B)

VEHICLE CONTROL DEVICE

BACKGROUND OF THE INVENTION

1. Field of the Invention

The present invention relates to a vehicle control device which controls vehicle speed so that the vehicle speed does not become upper-limit vehicle speed or higher, which is set based on a vehicle speed limit.

2. Description of the Related Art

Conventionally, a system referred to as an ISA (Intelligent Speed Adaptation) has been known. The ISA is a system which is mounted on a vehicle, such as an automobile, recognizes a speed limit set for a road which constitutes a traveling route, and controls vehicle speed not to exceed the speed limit. One of conventional devices having such a system recognizes a speed limit indicated on a traffic sign or road surface sign (road mark) based on an image of a scene in front of a vehicle captured by a CCD camera, and controls a driving source of a vehicle so that vehicle speed becomes the speed limit or less when the vehicle speed exceeds the speed limit (refer to the Patent Document 1 (PTL1)).

CITATION LIST

Patent Literature

[PTL1] Japanese Patent Application Laid-Open "kokai" No. 2005-128790

SUMMARY OF THE INVENTION

A speed limit set for a road is determined for every road on which a vehicle is running. Therefore, for example, as in a case when a vehicle goes from a main line into a branch line or a vehicle goes from a wide road to a narrow road, etc., a speed limit changes to various values along with running of a vehicle. However, in a conventional device, after a speed limit of a road on which a vehicle is running changes to a speed limit lower than the speed limit set before then (namely, after a vehicle goes into a road where a lower speed limit is set), vehicle speed of an own-vehicle is started to be controlled based on this lowered speed limit. As a result, there is a possibility that a state where the vehicle speed is over the lowered speed limit may continue comparatively long after the speed limit is lowered.

The present invention has been conceived in order to solve the above-mentioned problem. Namely, one of objectives of the present invention is to provide a vehicle control device which can substantially eliminate or shorten a period when vehicle speed exceeds a lowered speed limit when a vehicle goes into a road where a speed limit lower than before then during running of the vehicle.

A vehicle control device according to the present invention (which may be referred to as a "present invention device" henceforth) comprises, a speed limit acquisition means (20) configured to acquire a speed limit set for a road on a traveling route of an own-vehicle, a vehicle speed acquisition means (32, 40) configured to acquire vehicle speed which is running speed of said own-vehicle, and a vehicle speed control means (40, especially 41 and 42) configured to set an upper speed limit (Vmax) based on said speed limit and control said vehicle speed so that said vehicle speed does not become said upper speed limit or higher.

In accordance with the present invention device, the upper speed limit (Vmax) is set up based on the acquired speed limit, and the vehicle speed is controlled so as not to become the upper speed limit or more. However, as for a speed limit, the next speed limit (Lnext) which is the following (subsequent) speed limit set for a road on said traveling route may be lower than the present speed limit (Lnow). In this case, when the speed limit is switched to the next speed limit (Lnext) at a transition point (Pt) which is a point where the next speed limit (Lnext) starts to be applied, there is a possibility that a state where the vehicle speed is higher than the next speed limit (Lnext) may continue for a while.

Then, said vehicle speed control means is configured to decrease said vehicle speed so that said vehicle speed approaches the next speed limit (Lnext) (refer to "S414, S403, S417, S406 to S409" in FIG. 4, "S514 to S516" in FIG. 5 and "S602 to S604 and S406 to S409" in FIG. 6, etc.), from a time point when it is judged that a position of said own-vehicle (Pnow) is at a predetermined position (Ps) in front of a transition point (Pt) which is a point where said next speed limit starts to be applied (refer to the judgment as "Yes" at "S412" in FIG. 4 or the judgment as "No" at "S510" in FIG. 5), in a case where a specified condition that said next speed limit (Lnext) is lower than the present speed limit (Lnow) is satisfied (refer to the judgment as "Yes" at "S404" in FIG. 4 or at "S505" in FIG. 5).

In accordance with this, the vehicle speed is decreased the from the predetermined position (Ps) in front of the transition point (Pt) where application of the next speed limit (Lnext) is started so that the vehicle speed approached the next speed limit (Lnext). Therefore, as compared with a conventional device, the vehicle speed at a time point when the own-vehicle arrives at the transition point (Pt) becomes a value closer to the next speed limit (Lnext). Therefore, a period when the vehicle speed exceeds the next speed limit (Lnext) can be substantially eliminated or shortened.

In one aspect of the present control device,

Said vehicle speed control means is configured to decrease said vehicle speed so that said vehicle speed approaches said next speed limit by gradually decreasing said upper speed limit toward said next speed limit from said time point when it is judged that said position of said own-vehicle is at said predetermined position (refer to steps S410 to S418, S515, S516, S517 and S604, etc.), in a case where said specified condition is satisfied.

In accordance with this, the vehicle speed can be decreased from the predetermined position (Ps) so that the vehicle speed approaches the next speed limit (Lnext), by gradually changing the upper speed limit toward the next speed limit.

In one aspect of the present control device, said vehicle speed control means is configured to;

compute the longest deceleration distance (Smax) which is a distance required for decreasing said vehicle speed at the present time point (Vnow) to said next speed limit (Lnext) lower than said present speed limit (Lnow) at the minimum deceleration (Gmin) included in a predetermined acceptable deceleration range (from Gmin to Gmax), judge that said position of said own-vehicle is not said predetermined position (Ps), when a pre-transition distance (Dnow) which is a distance from said position of said own-vehicle (Pnow) to said transition point (Pt) is longer than said longest deceleration distance (Smax) (refer to the judgment as "Yes" at step S510.), and judge that said position of said own-vehicle is said predetermined position (Ps), when said pre-transition distance (Dnow) is said longest deceleration distance (Smax) or less (refer to the judgment as "No" at step S510).

In accordance with this, the own-vehicle is not decelerated from a point where the pre-transition distance (Dnow) is excessively long, in other words, a point where the position of the own-vehicle (Pnow) is excessively in front of the transition point (Pt). Therefore, obstruction of a smooth traffic flow can be avoided.

In one aspect of the present control device,
said vehicle speed control means is configured to;
compute the longest deceleration distance (Smax) which is a distance required for decreasing said vehicle speed at the present time point (Vnow) to said next speed limit (Lnext) at the minimum deceleration (Gmin) included in a predetermined acceptable deceleration range Tom Gmin to Gmax) (step S508),
compute the shortest deceleration distance (Smin) which is a distance required for decreasing said vehicle speed at the present time point (Vnow) to said next speed limit (Lnext) at the maximum deceleration (Gmax) included in said acceptable deceleration range (step S509),
judge that said position of said own-vehicle is not said predetermined position (Ps), when a pre-transition distance (Dnow) which is a distance from said position of said own-vehicle (Pnow) to said transition point (Pt) is longer than said longest deceleration distance (Smax) (refer to the judgment as "Yes" at step S510), and
judge that said position of said own-vehicle is said predetermined position (Ps) (refer to the judgment as "No" at step S510) and gradually decrease said upper speed limit (Vmax) at a predetermined deceleration (Ga) included in said acceptable deceleration range so that vehicle speed of said own-vehicle when said position of said own-vehicle reaches said transition point becomes identical to said next speed limit (Lnext) (refer to steps S515 to S517, S602 to S604, etc.), when said pre-transition distance (Dnow) is said longest deceleration distance (Smax) or less and said pre-transition distance (Dnow) is said shortest deceleration distance (Smin) or more.

In accordance with this, the upper speed limit (Vmax) is decreased at the predetermined deceleration (Ga) and, thereby, the upper speed limit (Vmax) at a time point then the own-vehicle arrives at the transition point (Pt) becomes substantially identical to the next speed limit (Lnext) and, therefore, the vehicle speed at the time point when the own-vehicle arrives at the transition point (Pt) also becomes substantially identical to the next speed limit (Lnext). As a result, a period when the vehicle speed exceeds the next speed limit (Lnext) can be substantially eliminated. Moreover, since the predetermined deceleration (Ga) is a deceleration within the acceptable deceleration range, rapid deceleration of the own-vehicle can be avoided. As a result, obstruction of a smooth traffic flow can be avoided.

In this case, said vehicle speed control means is configured to judge that said position of said own-vehicle is said predetermined position (refer to the judgment as "No" at step S510 and S513) and decrease said upper speed limit (Vmax) at said maximum deceleration (Gmax) (steps S519, S602, S603, S605 and S606), also when said pre-transition distance (Dnow) is less than said shortest deceleration distance (Smin).

In accordance with this, the vehicle speed at a time point when the own-vehicle arrives at the transition point (Pt) exceeds the next speed limit (Lnext). However, the vehicle speed at a time point when the own-vehicle arrives at the transition point (Pt) can be brought to be vehicle speed close to the next speed limit (Lnext), while excessively rapid deceleration of the own-vehicle is avoided. As a result, a period when the vehicle speed exceeds the next speed limit (Lnext) can be shortened.

In this case, the vehicle control device may further comprises a vehicle speed excess notification means (40 (43), 60, and "S801" in FIG. 8) configured to give a driver a vehicle speed excess notice which is a notice that there is a possibility that vehicle speed of said own-vehicle when said position of said own-vehicle reaches said transition point may be higher than said next speed limit, when said pre-transition distance (Dnow) is less than said shortest deceleration distance (Smin).

In accordance with this, the driver can recognize that there is a possibility that the vehicle speed when the position of the own-vehicle reaches the transition point may exceed the speed limit which is adopted at or after the transition point. Therefore, the driver can promptly decelerate the vehicle speed of the own-vehicle by canceling an accelerator operation or operating a brake, for example, in front of the transition point.

Furthermore, in a case where the present invention device is configured to decrease said upper speed limit when said specific condition is satisfied, it is desirable that the present invention device comprises an upper speed limit decrease notification means configured to give a driver an upper speed limit decrease notice which is a notice that said upper speed limit is decreased.

In accordance with this, the driver can recognize "the upper speed limit is lowered from a time point before the own-vehicle arrives at the transition point and, as a result, the own-vehicle is decelerated." Therefore, "a possibility that a sense of incongruity is given to the driver resulting from the vehicle speed being automatically decreased" can be reduced.

In this case, said vehicle speed control means may be configured to cancel (stop) that said upper speed limit is decreased, when a predetermined cancel operation is performed after said upper speed limit decrease notification has been performed.

In accordance with this, for example, when the driver does not wish the upper speed limit to be decreased based on a running state of the own-vehicle and a traffic situation around the own-vehicle, etc., the driver can cancel that the upper speed limit is decreased by performing a predetermined cancel operation. As a result, it becomes possible for the driver to maintain the vehicle speed of the own-vehicle or to accelerate the own-vehicle within the limits of the upper-limit vehicle speed.

In the above-mentioned explanation, in order to help understanding of the present invention, names and/or reference signs used in embodiments which will be mentioned later are attached in parenthesis to constituent elements of inventions corresponding to the embodiments. However, the constituent elements of the present invention are not limited to the embodiments specified with the above-mentioned reference signs. Other objectives, other features and accompanying advantages of the present invention will be easily understood from the following explanation about the embodiments of the present invention described referring to drawings.

DESCRIPTION OF THE INVENTION

Hereafter, vehicle control devices according to respective embodiments of the present invention will be explained, referring to drawings.

First Embodiment (Configuration)

Figure 1:
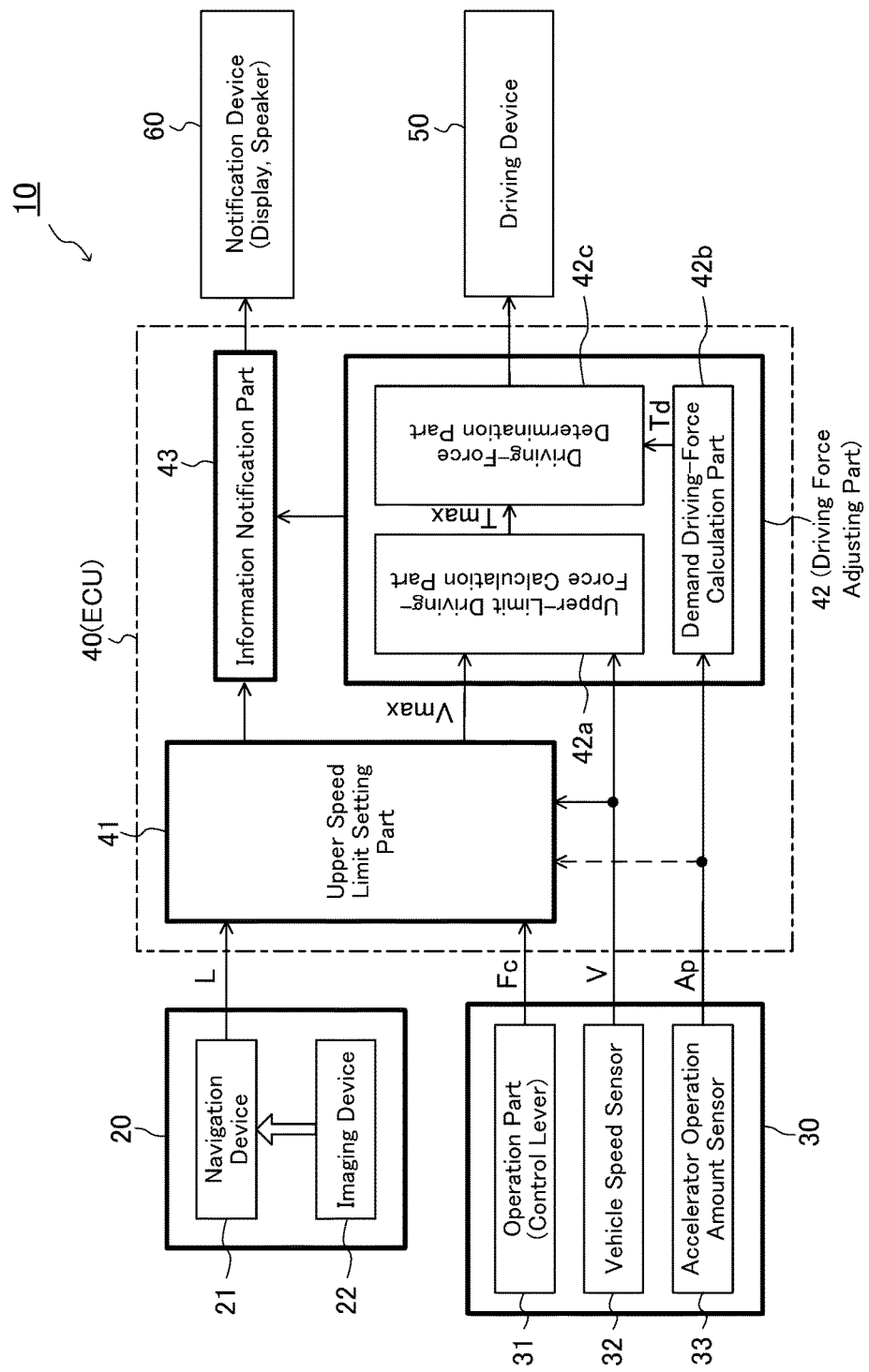
FIG. 1 is a block diagram for showing a configuration of a vehicle control device (first device) according to a first embodiment of the present invention.

FIG. 1 is a block diagram for showing a system configuration of a vehicle control device (which may be referred to as a "first device" hereafter) 10 according to a first embodiment of the present invention. The first device 10 is applied to a vehicle mounting only a gasoline fuel-injection type internal combustion engine as a power source. However, the internal combustion engine may be a diesel engine. Furthermore, the vehicle control devices according to respective embodiments of the present invention can be applied to an electric vehicle and a hybrid vehicle, etc.

The first device 10 comprises a speed limit acquisition part 20, a detection part 30, a vehicle assistance ECU 40, a driving device 50 and a notification device 60. Hereinafter, a target vehicle to be controlled may be referred to as an "own-vehicle." The vehicle assistance ECU 40 may be simply referred to as an "ECU 40" hereafter.

The speed limit acquisition part 20 comprises a navigation device 21 and an imaging device 22.

The navigation device 21 comprises a GPS (Global Positioning System), a data base (hard disk) which stores map information and facility information, etc., a display device, a speaker device, and a processing part mainly consisting of a microcomputer.

As well-known, the navigation device 21 can acquire a position Pnow of the own-vehicle at present (present own-vehicle position Pnow) based on a signal from a GPS satellite. Furthermore, the navigation device 21 can set a traveling route (scheduled traveling route) of the own-vehicle, based on a destination inputted (set) using the display device, the present own-vehicle position Pnow and the map information, and can give routing assistance to the driver of the own-vehicle. The map information includes information about speed limits set for respective roads. Therefore, the navigation device 21 can acquire a speed limit L set for each road (region) on the traveling route of the own-vehicle.

The imaging device 22 comprises a camera (for example, a CCD camera) and a processing part mainly consisting of a microcomputer. The imaging device 22 captures an image of a scene in front of the own-vehicle with the camera. Furthermore, the imaging device 22 can acquire a speed limit L set for each road (region) on the traveling route of the own-vehicle, by recognizing a speed limit currently indicated on a traffic sign and/or road surface sign (road mark) contained in the captured image with the processing part.

The navigation device 21 acquires the speed limit L acquired by the imaging device 22. When the speed limit L acquired by the imaging device 22 and a speed limit L which the navigation device 21 itself acquires are not equal to each other, the navigation device 21 adopts either one between these speed limits L, and transmit it to the ECU 40. For example, strictly speaking, the map information stored in the navigation device 21 is not the newest information, but is updated at a predetermined period. Therefore, when the speed limit for the same road can be acquired from both the navigation device 21 and the imaging device 22, the navigation device 21 transmits the speed limit L acquired from the imaging device 22 to the ECU 40 with higher priority.

The detection means 30 comprises an operation part 31, a vehicle speed sensor 32, and an accelerator operation amount sensor 33.

Figure 14:
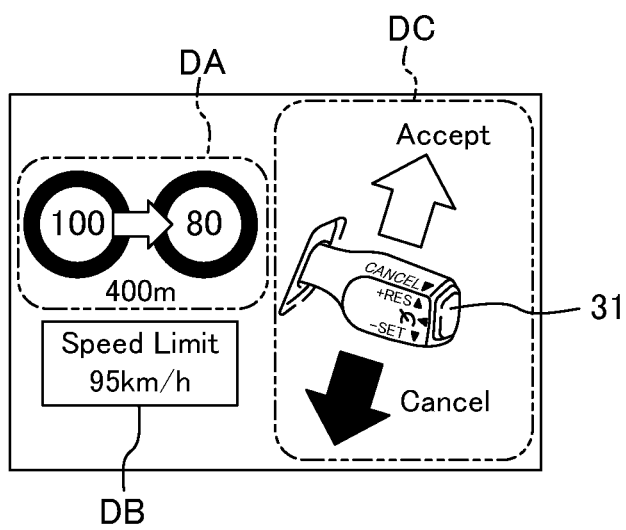
FIG. 14 is a view for showing a display indication in the fifth device.

The operation part 31 is a "control lever 31 prepared in a steering column" operated by a driver (refer to FIG. 14). When the operation part 31 is operated, a signal according to the operation is outputted to the ECU 40.

The vehicle speed sensor 32 detects rotational speed of an axle which is not shown, and outputs a signal representing running speed (namely, vehicle speed) V of the own-vehicle to the ECU 40.

The accelerator operation amount sensor 33 detects an operation amount (namely, accelerator operation amount) AP of an accelerator pedal which is not shown, and outputs a signal representing the accelerator operation amount Ap to the ECU 40.

The ECU 40 is an electronic control circuit which has a microcomputer including a CPU (Central Processing Unit), a ROM (Read-Only Memory), a RAM (Random-Access Memory) and an interface, etc., as a main component. The CPU attains various functions which will be mentioned later by performing an instruction (routine) stored in the memory (ROM). The ECU is an abbreviation for an electric control unit.

The ECU 40 comprises an upper speed limit setting part 41, a driving force adjusting part 42 and an information notification part 43, from the viewpoint of functions.

The upper speed limit setting part 41 sets (determines) the upper speed limit Vmax for controlling the vehicle speed V of the own-vehicle based on the speed limit L received from the navigation device 21. More specifically, the upper speed limit setting part 41 sets the speed limit L set for a road (region) where the own-vehicle is running at the present time as the upper speed limit Vmax. As will be mentioned later, the driving force adjusting part 42 controls vehicle speed (in fact, driving force of a vehicle) so that the vehicle speed V does not become the upper speed limit Vmax or higher.

By the way, a speed limit may be set to a value lower than a speed limit which was set for a road where an own-vehicle has been running until a certain time. In this case, when a new upper speed limit is set based on this lower speed limit thereafter, there is a possibility that a period when vehicle speed of the own-vehicle exceeds the lower speed limit may continue comparatively long.

Therefore, the upper speed limit setting part 41 changes the upper speed limit Vmax to a predetermined value lower than the speed limit L set for the region where the own-vehicle is currently running, at a time point before the own-vehicle goes into the region to which the lower speed limit L is applied. This point will be mentioned later in detail.

The driving force adjusting part 42 controls the vehicle speed V so that the vehicle speed V does not exceed the upper speed limit Vmax. More specifically, the driving force adjusting part 42 decreases the vehicle speed V to the upper speed limit Vmax at a deceleration G included in a predetermined acceptable rage of deceleration (namely, acceptable deceleration range) when the vehicle speed V is higher than the upper speed limit Vmax. In this specification, acceleration when an own-vehicle accelerates (increases its speed) in a forward direction is defined as positive acceleration. Therefore, in the present specification, the deceleration G means the magnitude (absolute value) of negative acceleration. Namely, it means that the larger the decelerating G becomes, the more rapid deceleration has occurred. Therefore, the above-mentioned acceptable deceleration range is a range from a "positive minimum deceleration Gmin" to a "positive maximum deceleration Gmax larger than the minimum deceleration Gmin" (0<Gmin<Gmax).

The driving force adjusting part 42 comprises an upper-limit driving-force calculation part 42a, a demand driving-force calculation part 42b, and a driving-force determination part 42c.

The upper-limit driving-force calculation part 42a determines driving force required to control the vehicle speed V so that the vehicle speed V becomes equal to the upper speed limit Vmax, i.e., upper-limit driving force Tmax. More specifically, the upper-limit driving-force calculation part 42a determines the upper-limit driving force Tmax by applying the upper speed limit Vmax set by the upper speed limit setting part 41 to a look-up-table MapTmax(Vmax) stored in the ROM. In addition, the upper-limit driving-force calculation part 42a may determine the upper-limit driving force Tmax by applying the upper speed limit Vmax and actual vehicle speed V to a look-up-table MapTmax(Vmax, V) stored in the ROM.

Furthermore, the upper-limit driving-force calculation part 42a computes an actual deceleration Gact of the own-vehicle based on a differential value (dV/dt) of the vehicle speed V, and determines the upper-limit driving force Tmax so that the deceleration Gact becomes identical to a "predetermined deceleration included in the acceptable deceleration range", when the vehicle speed V is larger than the upper speed limit Vmax and, therefore, it is necessary to decrease the vehicle speed V to the upper speed limit Vmax.

The demand driving-force calculation part 42b determines demand driving force Td which is driving force demanded by the driver, based on the accelerator operation amount Ap acquired from the accelerator operation amount sensor 33. More specifically, the demand driving-force calculation part 42b determines the demand driving force Td by applying an actual accelerator operation amount Ap to a look-up-table MapTd(Ap) stored in the ROM. In addition, the demand driving-force calculation part 42b may determine the demand driving force Td by applying the actual accelerator operation amount Ap and the actual vehicle speed V to a look-up-table MapTd(Ap, V) stored in the ROM.

The driving-force determination part 42c chooses, as target driving force Tt, smaller one of the upper-limit driving force Tmax determined by the upper-limit driving-force calculation part 42a and the demand driving force Td determined by the demand driving-force calculation part 42b, and controls the driving device 50 of the own-vehicle so as to generate the target driving force Tt.

In the present specification, "driving force" refers to a broad concept including not only driving force that is power for accelerating the own-vehicle in a forward direction, but also braking force that is power for decelerating the own-vehicle. Since the own-vehicle mounts only an internal combustion engine as a power source, the above-mentioned "driving force" includes driving force produced by the internal combustion engine and what is called engine braking power. Furthermore, the above-mentioned "driving force" includes braking force produced by a braking device of the own-vehicle.

The information notification part 43 acquires necessary information from the upper speed limit setting part 41 and the driving force adjusting part 42, and transmits an instruction signal to the notification device 60 so that necessary notification (provision of information) is performed to a driver.

The driving device 50 includes an internal combustion engine, an actuator of the internal combustion engine, a braking device and an actuator of the braking device. The driving device 50 makes the own-vehicle generate driving force according to the target driving force Tt received from the driving force adjusting part 42. The actuator of the internal combustion engine is a hydraulic actuator for changing an opening of a throttle valve which changes an intake air amount into the internal combustion engine, for example. The actuator of the braking device is a hydraulic actuator which adjusts oil pressure of hydraulic oil supplied to a wheel cylinder of the braking device, for example.

The notification device 60 comprises a display and a speaker. The notification device 60 provides a driver with information (driving assistance information) by displaying an image which will be mentioned later on the display, or generating sound or voice from a speaker, according to an instruction signal from the information notification part 43.

(Outline of Operation)

Figure 2:
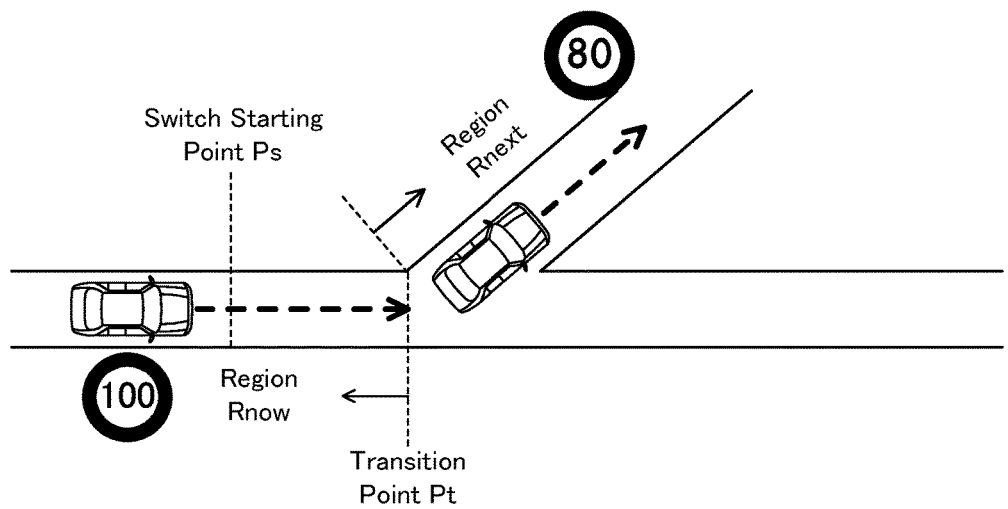
FIG. 2 is a schematic view for showing a situation that an own-vehicle goes from a road (region) where a relatively high speed limit is set into a road (region) where a relatively low speed limit is set, in accordance with a predetermined traveling route.

Next, an outline of an operation of the first device 10 will be explained. The first device 10 performs a different operation from the conventional device in a situation as shown in FIG. 2. FIG. 2 is a schematic view for showing a situation that an own-vehicle goes from a region (road, road region) where a relatively high speed limit is set into a region (road, road region) where a relatively low speed limit is set, in accordance with a predetermined traveling route. The arrow in a broken line expresses the traveling route of the own-vehicle. Specifically, the own-vehicle is running a main line (present region Rnow) where a speed limit of 100 km/h is set at the present time point, and goes into a branch line (next region Rnext) where a speed limit of 80 km/h is set at the transition point Pt. In other words, the transition point Pt is a point where a speed limit that is lower than the speed limit applied to the own-vehicle at the present time point begins to be applied to the own-vehicle.

Hereinafter, a speed limit set for the present region Rnow will be referred to as a "present speed limit Lnow", and a speed limit set for the next region Rnext that is a region into which the own-vehicle goes next to the present region Rnow will be referred to as a "next speed limit Lnext." Therefore, in an example shown in FIG. 2, the present speed limit Lnow=100 km/h, and the next speed limit Lnext=80 km/h.

In accordance with a conventional device, when the own-vehicle which is running the present region Rnow with the present speed limit Lnow goes into the next region Rnext with the next speed limit Lnext, the upper speed limit Vmax is changed from the present speed limit Lnow to the next speed limit Lnext. Therefore, when the next speed limit Lnext is lower than the present speed limit Lnow, there is a possibility that the vehicle speed V may greatly exceed the speed limit Lnext immediately after the own-vehicle goes into the next region Rnext and a time period in which the vehicle speed V is over the speed limit Lnext may become long.

Then, in a case where it is judged that the next speed limit Lnext is lower than the present speed limit Lnow, the first device 10 begins to decrease the upper speed limit Vmax from the present speed limit Lnow when the own-vehicle reaches the "predetermined point (switch starting point) Ps a predetermined distance in front" of the transition point Pt. Thereby, the first device 10 can control the vehicle speed V at the time point when the own-vehicle arrives at the transition point Pt to be vehicle speed close to the next speed limit Lnext (it is desirable that it is substantially identical to the Lnext).

Figure 3:
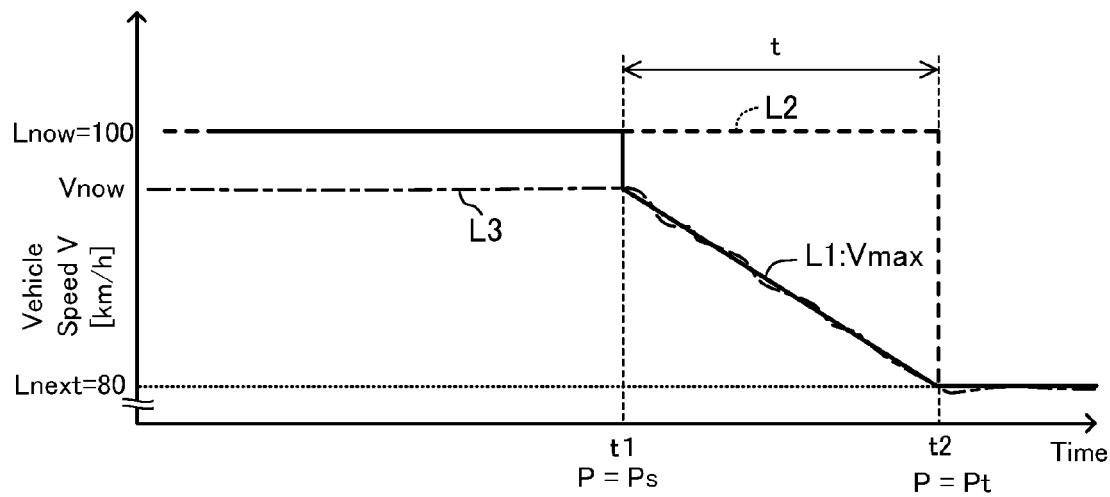
FIG. 3 (A) and (B) of FIG. 3 are graphs for showing time shifts of an upper speed limit changed by the first device.
Figure 3:
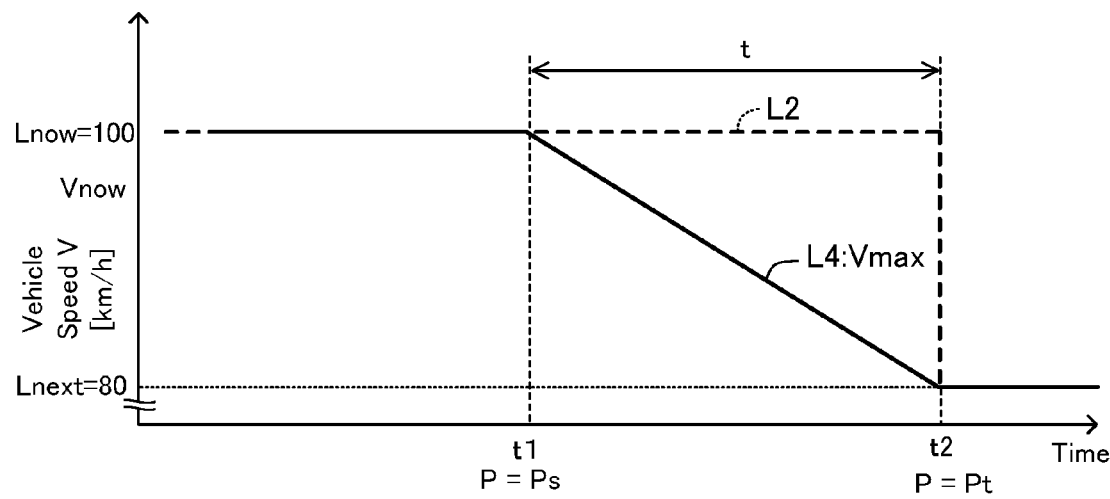

More specifically, as shown by a solid line L1 in (A) of FIG. 3, the first device 10 decreases the upper speed limit Vmax to the vehicle speed Vnow at that time point at the time t1 (namely, at a time point when the own-vehicle arrives at the switch starting point Ps), and decrease the upper speed limit Vmax at a constant deceleration Ga thereafter. The own-vehicle arrives at the transition point Pt at the time t2 when a time period t has passed since the time t1. The deceleration Ga is a deceleration which is the minimum deceleration Gmin or more and the maximum deceleration Gmax or less. Thereby, the vehicle speed V begins to fall at the deceleration Ga from the time t1, and becomes approximately identical to the next speed limit Lnext when the own-vehicle arrives at the transition point Pt. A broken line L2 shows the upper speed limit Vmax set by a conventional device.

In addition, when the vehicle speed Vnow at the time t1 is identical to the upper speed limit Vmax (when the vehicle speed Vnow is restricted by the upper speed limit Vmax) as shown in (B) of FIG. 3, the upper speed limit Vmax is decreased at the constant deceleration Ga from the upper speed limit Vmax at the time t1 as shown in a solid line L4. Thereby, the vehicle speed V is decreased at the deceleration Ga from the time t1.

Next, a modification method of the upper speed limit Vmax adopted by the first device 10 will be explained. First, the first device 10 determines a distance Sx based on the following formula (1) and formula (2). The distance Sx is a distance from a position P of the own-vehicle at the time t1 to the transition point Pt, and is referred to as a "deceleration distance Sx." t is a time from the time t1 to the time t2. Vnow is the vehicle speed V at the time t1. When the vehicle speed Vnow is lower than the next speed limit Lnext, the deceleration distance Sx is computed as "0."

$$Sx = Vnow \cdot t - (1/2) \cdot Ga \cdot t^2 \tag{1}$$

$$Lnext = Vnow - Ga \cdot t \tag{2}$$

The distance Sx is obtained by eliminating the variable t from the above-mentioned formula (1) and formula (2). On the other hand, the transition point Pt is a known value acquired by the navigation device 21. Then, the first device 10 obtains the switch starting point Ps from the transition point Pt and the deceleration distance Sx. When the place P of the own-vehicle becomes identical to the switch starting point Ps (namely, at the time t1), the first device 10 decreases the upper-limit vehicle speed Vmax to the vehicle speed Vnow at that time point, and decreases the upper-limit vehicle speed Vmax at the deceleration Ga until the position P of the own-vehicle arrives at the transition point Pt thereafter.

(Specific Operation)

Next, specific operation of the first device 10 will be explained. The CPU of the ECU 40 (which may be simply referred to as the "CPU" hereafter) is configured to perform an "assistance routine" shown by a flowchart in FIG. 4 whenever a predetermined time period (operation period) Δt passes.

When the assistance routine is started at step S401, the CPU progresses to step S402, and reads the present speed limit Lnow, the next speed limit Lnext, the transition point Pt, the present own-vehicle position Pnow and the vehicle speed V at the present time point (namely, the present vehicle speed Vnow).

Next, the CPU progresses to step S403, and judges whether a value of a decelerating flag Xd is "0." It is configured so that the value of the decelerating flag Xd is set to "0" in an initial routine (not shown) which is performed when an ignition key switch of the own-vehicle is changed into an ON position from an OFF position. The value of the decelerating flag Xd is set to "1" when the upper-limit vehicle speed Vmax is being decelerated before the transition point Pt (refer to S414 and step S418 which will be mentioned later).

Therefore, the value of the decelerating flag Xd is "0" during a usual running. Accordingly, the CPU judges at step S403 as "Yes" and progress to step S404, and judges whether the next speed limit Lnext is lower than the present speed limit Lnow.

When the next speed limit Lnext is the present speed limit Lnow or higher, the CPU judges as "No" at step S404 and progresses to step S405, and sets the upper speed limit Vmax to the present speed limit Lnow. Subsequently, the CPU performs processing at step S406 to step S409 in order, and progresses to step S495 and once ends this routine.

S406: The CPU computes the upper-limit driving force Tmax based on the upper speed limit Vmax (and the vehicle speed Vnow).

S407: The CPU computes the demand driving force Td based on the accelerator operation amount Ap.

S408: The CPU chooses the smaller one, as the target driving force Tt, smaller one of the upper-limit driving force Tmax and the demand driving force Td.

S409: The CPU controls the driving device 50 so as to generate the target driving force Tt.

On the other hand, in a case where the next speed limit Lnext is lower than the present speed limit Lnow at a time point when the CPU performs processing at step S404, the CPU judges at the step S404 as "Yes", performs processing at step S410 and step S411, which will be described below, in order, and progresses to step S412.

S410: The CPU computes the deceleration distance Sx based on the above-mentioned formula (1) and formula (2).

S411: The CPU acquires the pre-transition distance Dnow which is a distance from the present own-vehicle position Pnow to the transition point Pt from the navigation device 21.

Next, the CPU progresses to step S412, and judges whether the present time point is at a "time point immediately after the pre-transition distance Dnow has changed from a value larger than the deceleration distance Sx to a value smaller than the deceleration distance Sx." When the pre-transition distance Dnow is larger than the deceleration distance Sx, it is not necessary to change the upper speed limit Vmax. Therefore, in this case, the CPU judges at step S412 as "No" and performs the processing at step S405 to step S409.

On the contrary, when the present time point is at the "time point immediately after the pre-transition distance Dnow has changed from a value larger than the deceleration distance Sx to a value smaller than the deceleration distance Sx" (namely, when the own-vehicle arrives at the switch starting point Ps), the CPU judges at step S412 as "Yes", performs processing at step S413 and step S414, which will be described below, in order, and performs the processing at step S406 to step S409 thereafter.

Step S413: The CPU sets the vehicle speed Vnow to the upper speed limit Vmax.

Step S414: The CPU sets a value of the decelerating flag Xd to "1."

When the CPU starts processing again from step S401 in such a state, the CPU judges at step S403 following step S402 as "No" and progresses to step S415, and acquires the pre-transition distance Dnow by the same processing as that at step S411. Subsequently, the CPU progresses to step S416, and judges whether the pre-transition distance Dnow is larger than "0." Namely, the CPU judges whether it is before the own-vehicle arrives at the transition point Pt.

When the pre-transition distance Dnow is larger than "0", the CPU judges at step S416 as "Yes" and progresses to step S417, and decreases the upper speed limit Vmax at the deceleration Ga. Specifically, the CPU decreases the upper speed limit Vmax by a "product (multiplication) of the deceleration Ga by the operation-period Δt." Thereafter, the CPU performs processing at step S406 to step S409. As a result, the vehicle speed V is decreased together with the upper speed limit Vmax substantially at the deceleration Ga.

Thereafter, since the own-vehicle arrives at the transition point Pt, the pre-transition distance Dnow becomes "0" or less. Therefore, in this case, when the CPU progresses to step S416, the CPU judges at that step S416 as "No" and progress to step S418, and sets a value of the decelerating flag Xd to "0" (clears the decelerating flag Xd). Thereafter, the CPU performs processing at step S405 to step S409.

As explained in the above, the first device 10 decreases the upper-limit vehicle speed Vmax toward the next speed limit Lnext, from the predetermined position Ps in front of the transition point Pt where the next speed limit Lnext starts to be applied. In other words, the first device 10 decreases the upper-limit vehicle speed Vmax so that the upper-limit vehicle speed Vmax becomes identical to the next speed limit Lnext at a time point when the own-vehicle arrives at the transition point Pt. Therefore, the vehicle speed is decreased so that the vehicle speed approaches the next speed limit Lnext from a time point when the own-vehicle arrives at the predetermined position Ps, and the vehicle speed at a time point when the own-vehicle arrives at the transition point Pt becomes substantially identical to the next speed limit Lnext. Therefore, a period when the vehicle speed is over the next speed limit (Lnext) can be eliminated substantially.

Second Embodiment

By the way, for example, in a case where the next speed limit Lnext is acquired by the imaging device 22 and a case where a speed limit is switched due to bad weather, etc., a state where the pre-transition distance Dnow has already been less than the deceleration distance Sx when the next speed limit Lnext is acquired may occur. Also in such a case, it is desirable to decelerate the own-vehicle as soon as possible at the deceleration G within the acceptable deceleration range.

Therefore, a vehicle control device (which may be referred to as a "second device" hereafter) according to a second embodiment of the present invention performs (processing A) to (processing E) which will be described below.

(Processing A) The second device computes the longest deceleration distance Smax by setting the deceleration Ga to the minimum deceleration Gmin in the above-mentioned formula (1) and formula (2).

(Processing B) The second device computes the shortest deceleration distance Smin by setting the deceleration Ga to the maximum deceleration Gmax in the above-mentioned formula (1) and formula (2).

(Processing C) The second device maintain the upper speed limit Vmax at the present speed limit Lnow without changing the upper speed limit Vmax, when the pre-transition distance Dnow is longer than the longest deceleration distance Smax (Dnow>Smax).

(Processing D) The second device obtains the deceleration Ga by setting the deceleration distance Sx equal to the pre-transition distance Dnow in the above-mentioned formula (1) and formula (2) (in other words, assuming that the present own-vehicle position Pnow is the switch starting point Ps), when the pre-transition distance Dnow is the longest deceleration distance Smax or less and the shortest deceleration distance Smin or more (Smax≥Dnow≥Smin). Then, the second device sets the upper speed limit Vmax to the present vehicle speed Vnow at the present time, and decreases the upper speed limit Vmax at the deceleration Ga until the own-vehicle arrives at the transition point Pt thereafter.

(Processing E) The second device sets the upper speed limit Vmax to the present vehicle speed Vnow at the present time, and decreases the upper speed limit Vmax at the maximum deceleration Gmax from the present time point until the own-vehicle arrives at the transition point Pt thereafter, when the pre-transition distance Dnow is less than the shortest deceleration distance Smin (Dnow<Smin). Furthermore, the second device sets the upper speed limit Vmax to the next speed limit Lnext (in fact, the present speed limit Lnow immediately after it being switched), at a time point when the own-vehicle arrives at the transition point Pt.

(Specific Operation)

Next, a specific operation of the second device will be explained. The CPU of the ECU 40 of the second device is configured to perform an "assistance routine" shown by flowcharts in FIG. 5 and FIG. 6 whenever a predetermined time period (operation period) dt passes.

When the assistance routine is started at step S501, the CPU progresses to step S502, and reads the present speed limit Lnow, the next speed limit Lnext, the transition point Pt, the present own-vehicle position Pnow and the present vehicle speed Vnow. Next, the CPU progresses to step S503, and acquires the pre-transition distance Dnow which is a distance from the present own-vehicle position Pnow to the transition point Pt from the navigation device 21.

Next, the CPU progresses to step S504, and judges whether a value of the decelerating flag Xd is "0." It is configured so that the value of the decelerating flag Xd is also set to "0" in an initial routine.

Therefore, the value of the decelerating flag Xd is "0" during a usual running. Accordingly, the CPU judges at step S504 as "Yes" and progresses to step S505, and judges whether the next speed limit Lnext is lower than the present speed limit Lnow.

When the next speed limit Lnext is the present speed limit Lnow or higher, the CPU judges at step S505 as "No" and progresses to step S506, and sets a value of the decelerating flag Xd to "0" (clears the decelerating flag Xd). In this case, the value of the decelerating flag Xd is set to "0" as a confirmation. Furthermore, the CPU sets a value of a mode flag Xm to "0" (clears the mode flag Xm). It is configured so that the value of this mode flag Xm is also set to "0" in an initial routine. Subsequently, the CPU progresses to step S507, sets the upper speed limit Vmax to the present speed limit Lnow, and progresses to step S595 and once ends this routine. As a result, when the next speed limit Lnext is the present speed limit Lnow or higher, the upper speed limit Vmax is maintained at the present speed limit Lnow.

On the other hand, in a case where the next speed limit Lnext is lower than the present speed limit Lnow at a time point when the CPU performs the processing at step S505, the CPU judges at the step S505 as "Yes", performs processing at step S508 and step S509, which will be described below, in order, and progresses to step S510.

Step S508: The CPU computes the longest deceleration distance Smax as mentioned above. Namely, the CPU performs the above-mentioned processing A.

Step S509: The CPU computes the shortest deceleration distance Smin as mentioned above. Namely, the CPU performs the above-mentioned processing B.

Next, the CPU progresses to step S510, and judges whether the pre-transition distance Dnow is larger than the longest deceleration distance Smax. When the pre-transition distance Dnow is larger than the longest deceleration distance Smax, it is not necessary to change the upper speed limit Vmax. Therefore, in this case, the CPU judges at step S510 as "Yes" and performs processing at step S511 and step S512, which will be described below, and progresses to step S595 and once ends this routine.

Step S511: The CPU sets the upper speed limit Vmax to the present speed limit Lnow.

Step S512: The CPU sets the value of the decelerating flag Xd to "0" (clears the decelerating flag Xd), and sets the value of the mode flag Xm to "0" (clears the mode flag Xm). Also in this case, the value of the decelerating flag Xd is set to "0" as a confirmation.

On the other hand, in a case where the pre-transition distance Dnow is the longest deceleration distance Smax or less at a time point when the CPU performs processing at step S510, the CPU judges at the step S510 as "No" and progresses to step S513, and judges whether the pre-transition distance Dnow is the shortest deceleration distance Smin or more and the longest deceleration distance Smax (Smin≤Dnow≤Smax). When this judgment condition is satisfied, the CPU judges at step S513 as "Yes", performs processing at step S514 to step S516, which will be described below, in order, and progresses to step S595 and once ends this routine.

Step S514: The CPU sets the upper speed limit Vmax to the vehicle speed Vnow.

Step S515: The CPU computes the deceleration Ga as mentioned above. Namely, the CPU performs a part of the above-mentioned processing D.

Step S516: The CPU sets the value of the decelerating flag Xd to "1", and sets the value of the mode flag Xm to "1."

Figure 6:
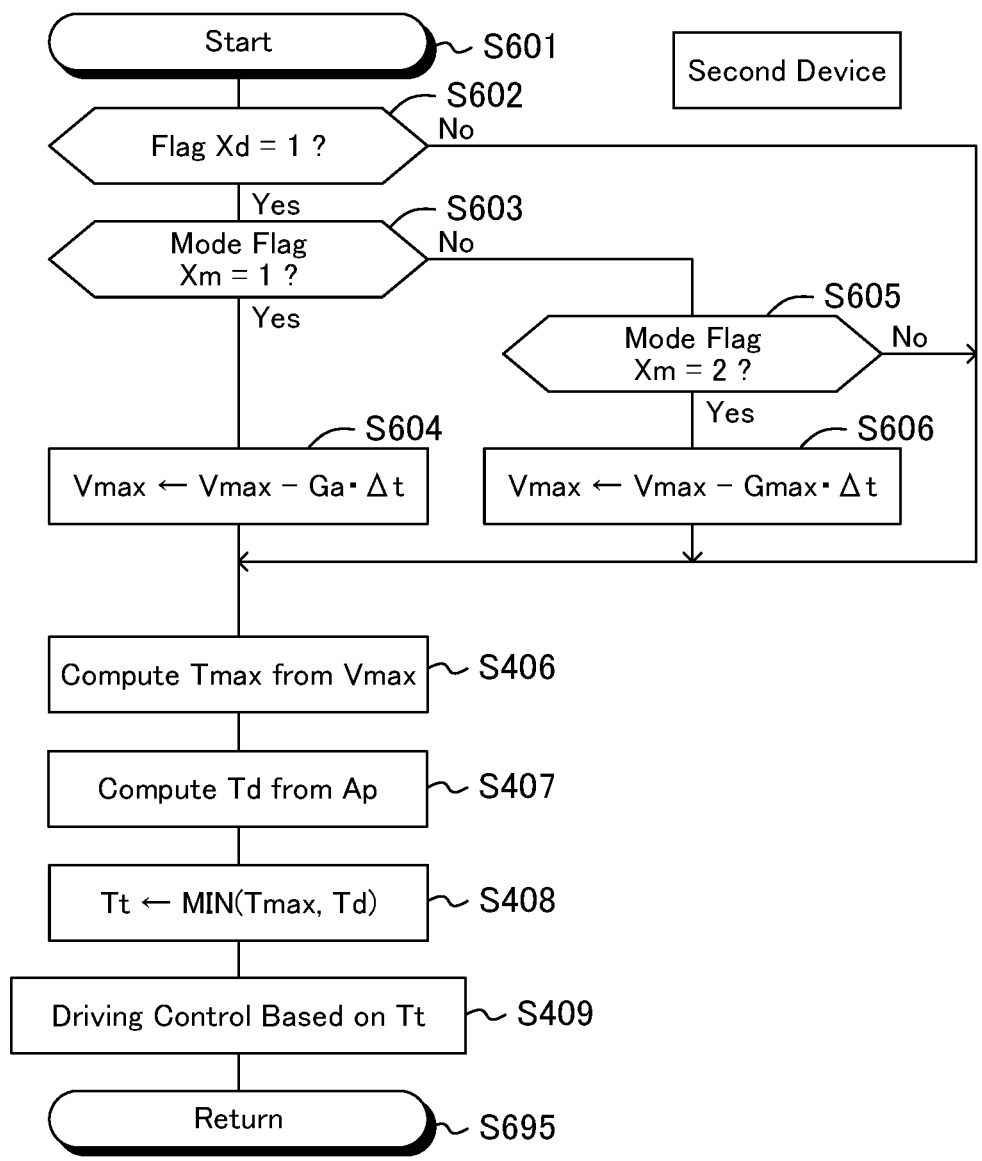
FIG. 6 is a flowchart for showing a routine which the CPU of the second device performs.

By the way, as mentioned above, the CPU is performing the routine shown in FIG. 6 whenever the operation period Δt passes. Therefore, when it becomes a predetermined timing, the CPU starts processing from step S601 in FIG. 6 and progresses to step S602, and judges whether the value of the decelerating flag Xd is "1." When the value of the decelerating flag Xd is not "1", the CPU judges at step S602 as "No", and performs processing at the above-mentioned step S406 to step S409.

Figure 5:
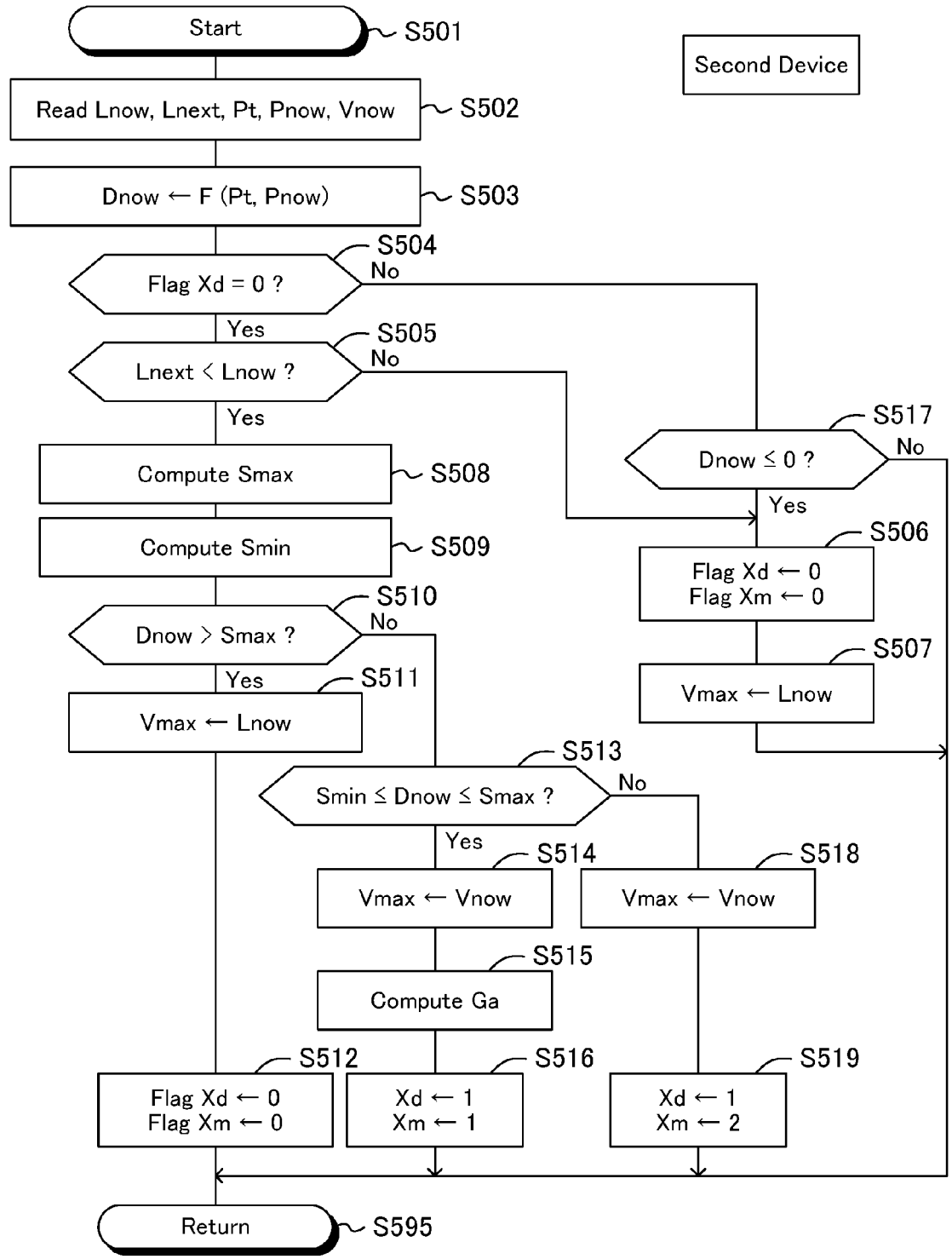
FIG. 5 is a flowchart for showing a routine which a CPU of a vehicle control device according to a second embodiment of the present invention (second device) performs.

On the contrary, for example, when the processing at step S516 in FIG. 5 is being performed, the value of the decelerating flag Xd is "1." Therefore, the CPU judges at step S602 as "Yes" and progresses to step S603, and judge whether the value of the mode flag Xm is "1."

When the processing at step S516 in FIG. 5 is being performed, the value of the mode flag Xm is "1." Therefore, in this case, the CPU judges at step S603 as "Yes" and progresses to step S604, and decreases the upper speed limit Vmax at the "deceleration Ga determined at step S515 in FIG. 5." Specifically, the CPU decreases the upper speed limit Vmax by the "product of the deceleration Ga by the operation period Δt." Thereafter, the CPU performs processing at step S406 to step S409. As a result, since the vehicle speed V is restricted by the upper speed limit Vmax, the vehicle speed V is decreased together with the upper speed limit Vmax substantially at the deceleration Ga.

Furthermore, when the processing at step S516 in FIG. 5 is being performed, the value of the decelerating flag Xd is set to "1." Therefore, in this case, when the CPU progresses to step S504 in FIG. 5, the CPU judges as "No" at that step S504 and progresses to step S517, and judges whether the pre-transition distance Dnow is "0" or less. Namely, the CPU judges whether the own-vehicle arrived at the transition point Pt. Then, when the pre-transition distance Dnow is larger than "0" (namely, when the own-vehicle has not yet arrived at the transition point Pt), the CPU judges at step S517 as "No", and progresses to step S595 directly.

On the contrary, when the pre-transition distance Dnow is "0" or less, the CPU judges at step S517 as "Yes", and progresses to the above-mentioned step S506 and step S507. As a result, both the value of the decelerating flag Xd and the value of the mode flag Xm are returned to "0", and the upper-limit vehicle speed Vmax is set to the present speed limit Lnow which used to be the next speed limit Lnext until just before.

On the other hand, in a case where the judgment condition at the step S513 is not satisfied (namely, Dnow<Smin) at a time point when the CPU performs processing at step S513 in FIG. 5, the CPU judges at step S513 as "No", performs processing at step S518 and step S519, which will be described below, in order, and progresses to step 595.

Step S518: The CPU sets the upper speed limit Vmax to the vehicle speed Vnow.

Step S519: The CPU sets the value of the decelerating flag Xd to "1", and sets the value of the mode flag Km to "2."

In this state, when the CPU progresses to step S602 in FIG. 6, the CPU judges at that step S602 as "Yes", and further judges at step S603 as "No." Then, the CPU progresses to step S605, and judges whether the value of the mode flag Xm is "2." In this case, the value of the mode flag Km is "2."

Therefore, the CPU judges at step S605 as "Yes" and progresses to step S606, and decreases the upper speed limit Vmax at the maximum deceleration Gmax. Specifically, the CPU decreases the upper speed limit Vmax by the "product of the maximum deceleration Gmax by the operation period Δt." Thereafter, the CPU performs processing at step S406 to step S409. As a result, since the vehicle speed V is restricted by the upper speed limit Vmax, the vehicle speed V is decreased substantially at the maximum deceleration Gmax. Also in this case, since the vehicle speed V is restricted by the upper speed limit Vmax, the vehicle speed V is decreased together with the upper speed limit Vmax substantially at the maximum deceleration Gmax, until it is judged as "Yes" at step S517 in FIG. 5 (namely, the own-vehicle arrives at the transition point Pt).

In addition, in a case where the value of the mode flag Xm is not "2" at a time point when the CPU performs processing at step S605 in FIG. 6, the CPU judges at the step S605 as "No", and performs processing at step S406 to step S409.

Figure 7:
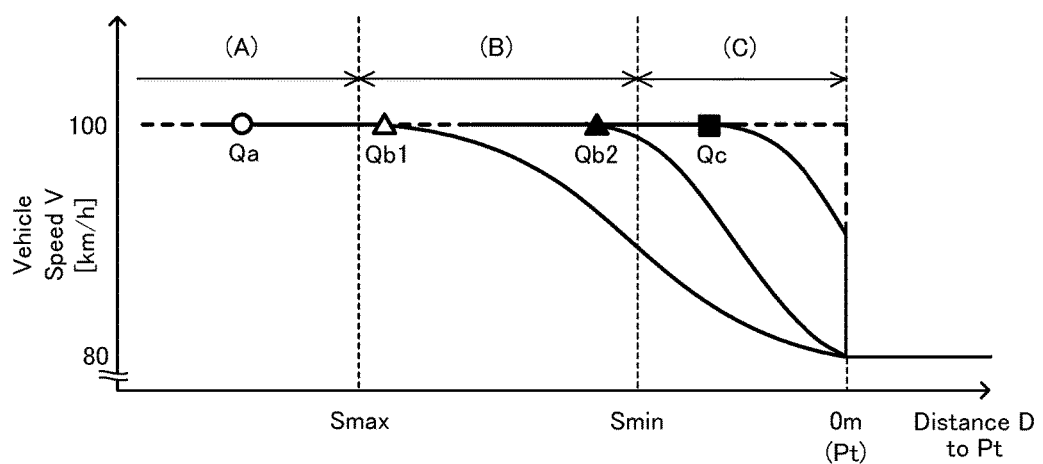
FIG. 7 is a graph for showing a transition of "vehicle speed controlled by the second device" with respect to a distance to a transition point.

An operation of such a second device will be explained referring to FIG. 7. FIG. 7 is a graph for showing the upper speed limit Vmax controlled by the second device. In this graph, solid curved lines express the upper speed limit Vmax, and a broken polygonal line represents the speed limit L in respective regions, respectively. In addition, a traveling route of the own-vehicle in the following explanation is the same as the traveling route that has been already explained referring to FIG. 2. Therefore, also in this example, the present speed limit Lnow is 100 km/h, and the next speed limit Lnext is 80 km/h. Furthermore, it is assumed that the vehicle speed is 100 km/h as a result of restriction by "the upper speed limit Vmax set to the present speed limit Lnow (=100 km/h)" at a point where the own-vehicle is sufficiently far from the transition point Pt.

First, a case where the next speed limit Lnext is acquired when the own-vehicle is running a point included in a region (A) in the drawing (refer to a point Cha) and it turns out that the next speed limit Lnext is lower than the present speed limit Lnow will be explained. In this case, the pre-transition distance Dnow is larger than the longest deceleration distance Smax which is a distance required for decelerating the vehicle speed V of the own-vehicle from the present vehicle speed Vnow (100 km/h) to the next speed limit Lnext (80 km/h) at the minimum deceleration Gmin (Dnow>Smax). In this situation, since the above-mentioned processing C is performed, the upper speed limit Vmax is maintained at the present speed limit Lnow (100 km/h) without being changed.

By this processing C, it can be avoided that the own-vehicle starts to be decelerated at a point excessively in front of the transition point Pt. Therefore, a possibility that an inconvenient situation, such as a situation where traffic congestion arises in front of the transition point Pt and thereby smooth traffic is obstructed, for example, may occur can be reduced.

Next, a case where the next speed limit Lnext is acquired when the own-vehicle is running a point included in a region (B) in the drawing (refer to a point Qba and a point Qb2) and it turns out that the next speed limit Lnext is lower than the present speed limit Lnow will be explained. In this case, all the pre-transition distances Dnow corresponding to the respective points are the longest deceleration distance Smax or less and the shortest deceleration distance Smin or more (Smax≥Dnow≥Smin). In this situation, since the above-mentioned processing D is performed, the upper speed limit Vmax is decreased to the present vehicle speed Vnow at a "time point when it turns out that the next speed limit Lnext is lower than the present speed limit Lnow." However, in an example shown in FIG. 7, since the present vehicle speed Vnow at a time point when it turns out that the next speed limit Lnext is lower than the present speed limit Lnow is identical to the present speed limit Lnow, the upper speed limit Vmax is not decreased. Thereafter, the upper speed limit Vmax is decreased at the above-mentioned deceleration Ga.

In addition, when the "time point when it turns out that the next speed limit Lnext is lower than the present speed limit Lnow" is close to the "time point when the own-vehicle is running the point Qb1", the above-mentioned deceleration Ga comes to be deceleration close to the minimum deceleration Gmin. On the contrary, when the "time point it turns out that the next speed limit Lnext is lower than the present speed limit Lnow" is close to the "time point when the own-vehicle is running the point Qb2", the above-mentioned deceleration Ga comes to be deceleration close to the maximum deceleration Gmax.

By this processing D, the vehicle speed can be certainly decreased to the next speed limit Lnext (or less) at the "deceleration Ga within the acceptable deceleration range" in a segment from a point moderately in front of the transition point Pt to the transition point Pt. Therefore, it can be avoided that the vehicle speed V of the own-vehicle exceeds the speed limit Lnext in a period immediately after the own-vehicle goes from the present region Rnow into the next region Rnext.

Next, a case where the speed limit Lnext was acquired when the own-vehicle is running a point included in a region (C) in the drawing (refer to a point Qc) and it turns out that the next speed limit Lnext is lower than the present speed limit Lnow will be explained. In this case, the pre-transition distance Dnow is less than the shortest deceleration distance Smin (Dnow<Smin). In this situation, since the above-mentioned processing E is performed, the upper speed limit Vmax is decreased to the present vehicle speed Vnow at the "time point when it turns out that the next speed limit Lnext is lower than the present speed limit Lnow." However, in the example shown in FIG. 7, since the present vehicle speed Vnow at a time point when it turns out that the next speed limit Lnext is lower than the present speed limit Lnow is identical to the present speed limit Lnow, the upper speed limit Vmax is not decreased. Thereafter, the upper speed limit Vmax is decreased at the above-mentioned maximum deceleration Gmax.

When this processing E is performed, since the pre-transition distance Dnow is too short, the vehicle speed V of the own-vehicle cannot be decreased to the next speed limit Lnext at deceleration in the acceptable deceleration range before the transition point Pt. However, by the processing E, the vehicle speed V can be decreased and brought close to the next speed limit Lnext before the own-vehicle arrives at the transition point Pt. Therefore, a period when the vehicle speed V of the own-vehicle is over the speed limit Lnext after the own-vehicle goes from the present region Rnow into the next region Rnext can be shortened.

Third Embodiment

By the way, when the vehicle speed V of the own-vehicle cannot be decelerated to the next speed limit Lnext before the transition point Pt since the pre-transition distance Dnow is insufficient like the above-mentioned processing E, it is desirable that a driver operates a brake to promptly slow down the vehicle speed V of the own-vehicle to the speed limit Lnext or less, for example. For this purpose, it is necessary to make a driver recognize that there is a possibility that the vehicle speed V of the own-vehicle may exceed the speed limit Lnext in the next region Rnext.

Then, when the vehicle speed V of the own-vehicle cannot be decreased to the next speed limit Lnext at deceleration within the acceptable deceleration range before the transition point Pt since the pre-transition distance Dnow is too short, a vehicle control device according to the third embodiment of the present invention (which may be referred to as a "third device" hereafter) notifies a driver of that effect and/or related matter thereto. Except for this point, the third device operates like the above-mentioned second device.

(Specific Operation)

Figure 8:
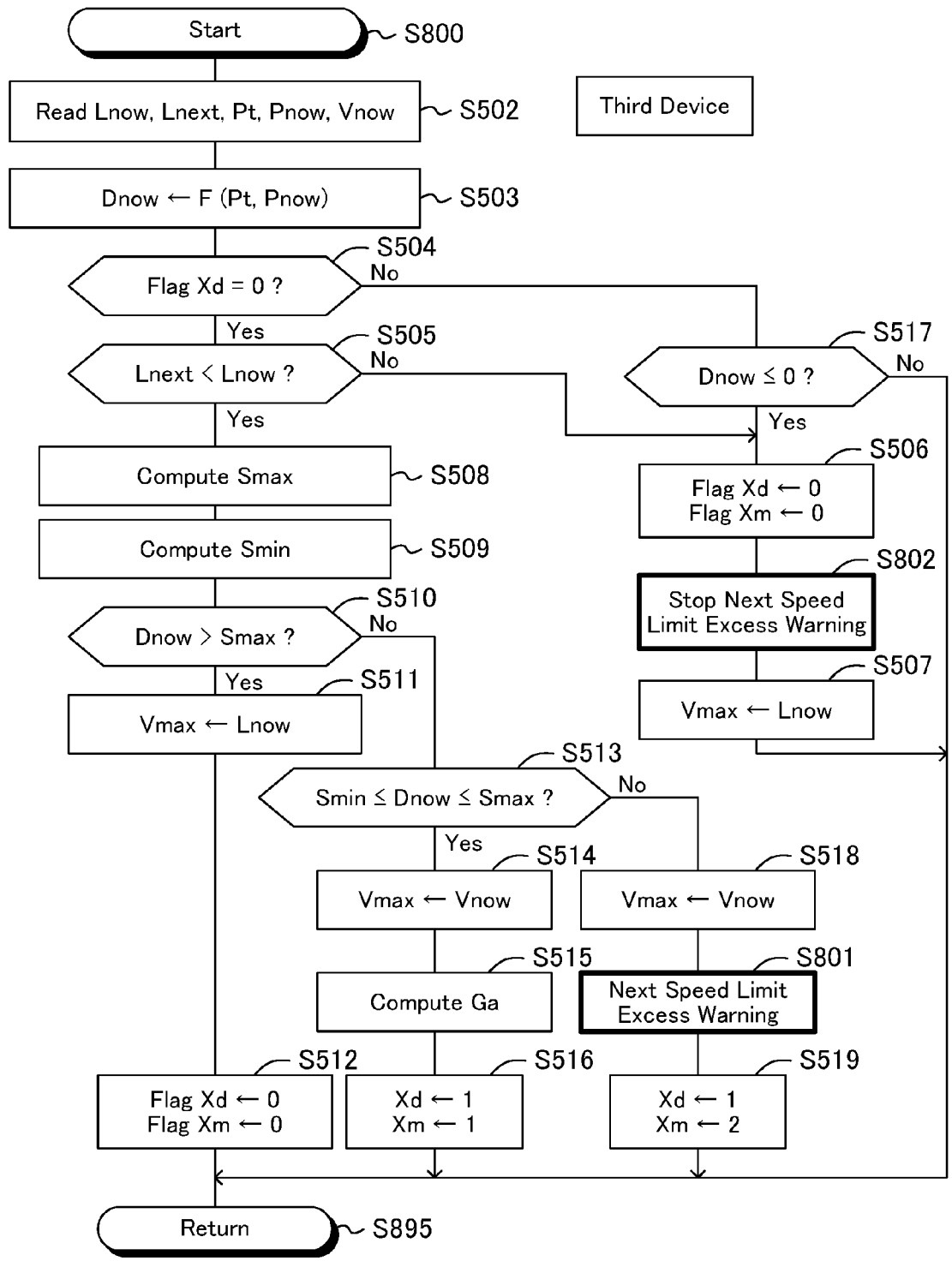
FIG. 8 is a flowchart for showing a routine which a CPU of a vehicle control device according to a third embodiment of the present invention (third device) performs.

The CPU of the ECU 40 of the third device is configured to perform an "assistance routine" shown by flowcharts in FIG. 8 and FIG. 6 whenever a predetermined time (operation period) At passes. The third device is the same as the second device except for a point that it performs the routine shown in FIG. 8 in place of the routine shown in FIG. 5. Furthermore, the routine shown in FIG. 8 is different from the routine shown in FIG. 5 only in a point that step S801 is prepared between step S518 and step S519 and a point that step S802 is prepared between step S506 and step S507. Therefore, these differences will be explained with a focus thereon hereafter.

After ending a processing at step S518, the CPU of the ECU 40 of the third device progresses to step S801, and performs a "next speed limit excess warning" using the notification device 60. The "next speed limit excess warning" is carried out by indicating that "there is a possibility that the vehicle speed of the own-vehicle may exceed the next speed limit" on a display of the notification device 60, emitting message sound or message voice purporting that "a brake operation is recommended since there is a possibility that the vehicle speed of the own-vehicle may exceed the next speed limit" from a speaker of the notification device 60, or simply emitting an audible alarm (warning sound).

Furthermore, after ending processing at step S506 in FIG. 8, the CPU progresses to step S802, and stops the "next speed limit excess warning." When the next speed limit excess warning is not occurring when the CPU performs the processing at step S802, the CPU does not perform the processing at step S802. Furthermore, the CPU is configured to immediately stop the next speed limit excess warning by performing a routine not shown when a driver operates a brake and the vehicle speed Vnow becomes the next speed limit Lnext or less.

In accordance with this, when the vehicle speed V of the own-vehicle cannot be decreased to the next speed limit Lnext at deceleration within the acceptable deceleration range before the transition point Pt since the pre-transition distance Dnow is too short, the driver can recognize that there is a possibility that the vehicle speed V of the own-vehicle may exceed the speed limit Lnext in the next region Rnext by the "next speed limit excess warning." Therefore, the driver can promptly decelerate the vehicle speed V of the own-vehicle to the speed limit Lnext or less by operating the braking device (brake) of the vehicle, for example.

Fourth Embodiment

A vehicle control device according to a fourth embodiment of the present invention (which may be referred to as a "fourth device" hereafter) is different from the first device only in a point that, when the upper speed limit Vmax is decreased and thereby the own-vehicle is slowed down (decelerated), the fourth device notifies a driver of that effect and/or related matter thereto. Configuration of the fourth device can be also applied to both the second device and the third device.

(Operation)

Figure 9:
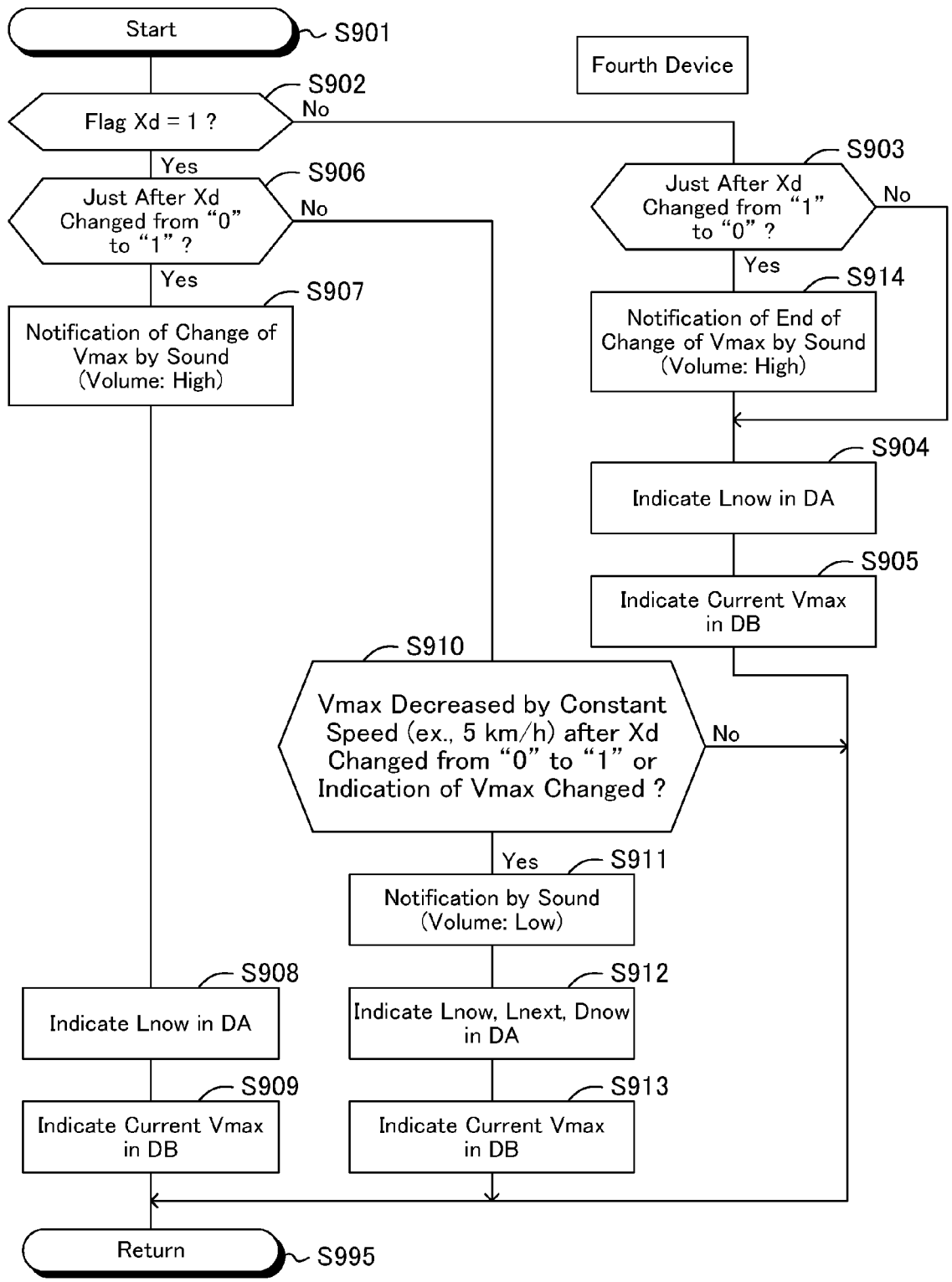
FIG. 9 is a flowchart for showing a routine which a CPU of a vehicle control device according to a fourth embodiment of the present invention (fourth device) performs.

In addition to the routine which the CPU of the ECU 40 of the first device performs, the CPU of the ECU 40 of the fourth device is configured to perform a "notification routine" shown by a flowchart in FIG. 9 whenever a predetermined time (operation period) Δt passes. Hereafter, an operation of the CPU will be explained along with an example shown in FIG. 10. The example shown in FIG. 10 is also an example in a situation as shown in FIG. 2 and, therefore, the present speed limit Lnow is 100 km/h, and the next speed limit Lnext is 80 km/h.

After starting the notification routine at step S901, the CPU progresses to step S902, and judges whether a value of the decelerating flag Xd is "1."

Figure 10:
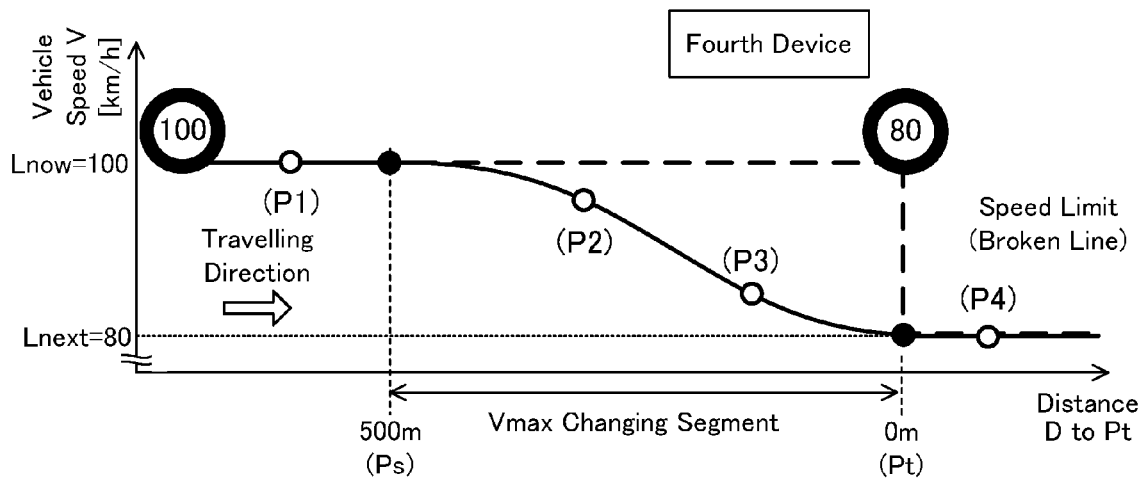
FIG. 10 is a schematic view for representing a transition of upper-limit vehicle speed controlled by the fourth device, a decelerating flag, examples of a notification by indication, and examples of a notification by sound.
Figure 10:
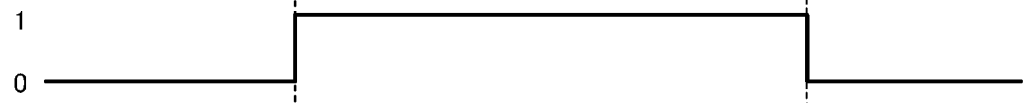
Figure 10:
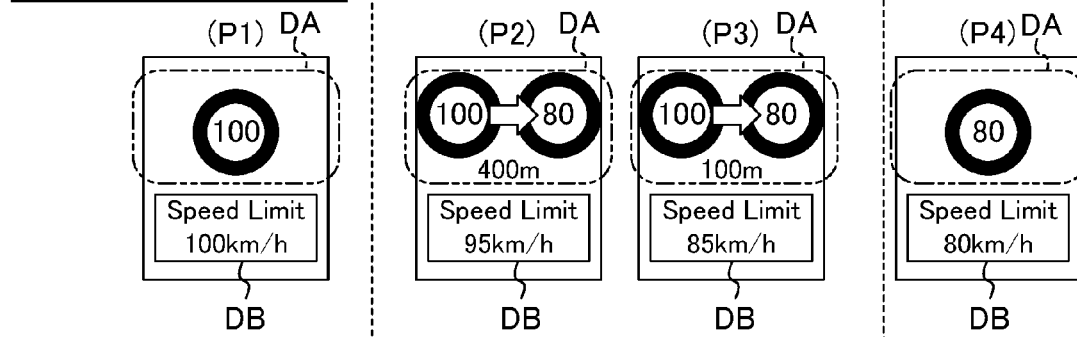
Figure 10:
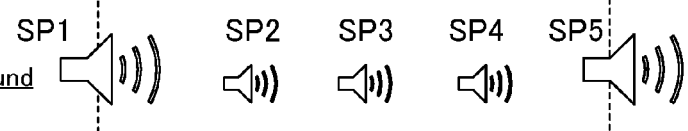

For example, when the own-vehicle is running a point P1 shown in FIG. 10, decrease in the upper speed limit Vmax has not yet been started and, therefore, the value of the decelerating flag Xd is "0." Accordingly, the CPU judges at step S902 as "No" and progresses to step S903, and judges whether the present time point is a "time point immediately after the decelerating flag Xd is changed from "1" to "0."

When the own-vehicle is running the point P1 shown in FIG. 10, the value of the decelerating flag Xd is maintained at "0." Therefore, thee CPU judges at step S903 as "No", performs processing at step S904 and step S905, which will be described below, in order, and progresses to step S995 and once ends this routine.

Step S904: The CPU indicates the present speed limit Lnow in a predetermined display area DA on the display of the notification device 60. As a result, as shown in (P1) in (C) of FIG. 10, the present speed limit Lnow (in this case, 100 km/h) is indicated in the display area DA.

Step S905: The CPU indicates the upper speed limit Vmax at the present time point in a predetermined display area DB on the display of the notification device 60. As a result, as shown in (P1) in (C) of FIG. 10, the upper speed limit Vmax at the present time point (in this case, 100 km/h) is indicated as "Speed Limit" in the display area DB.

Figure 4:
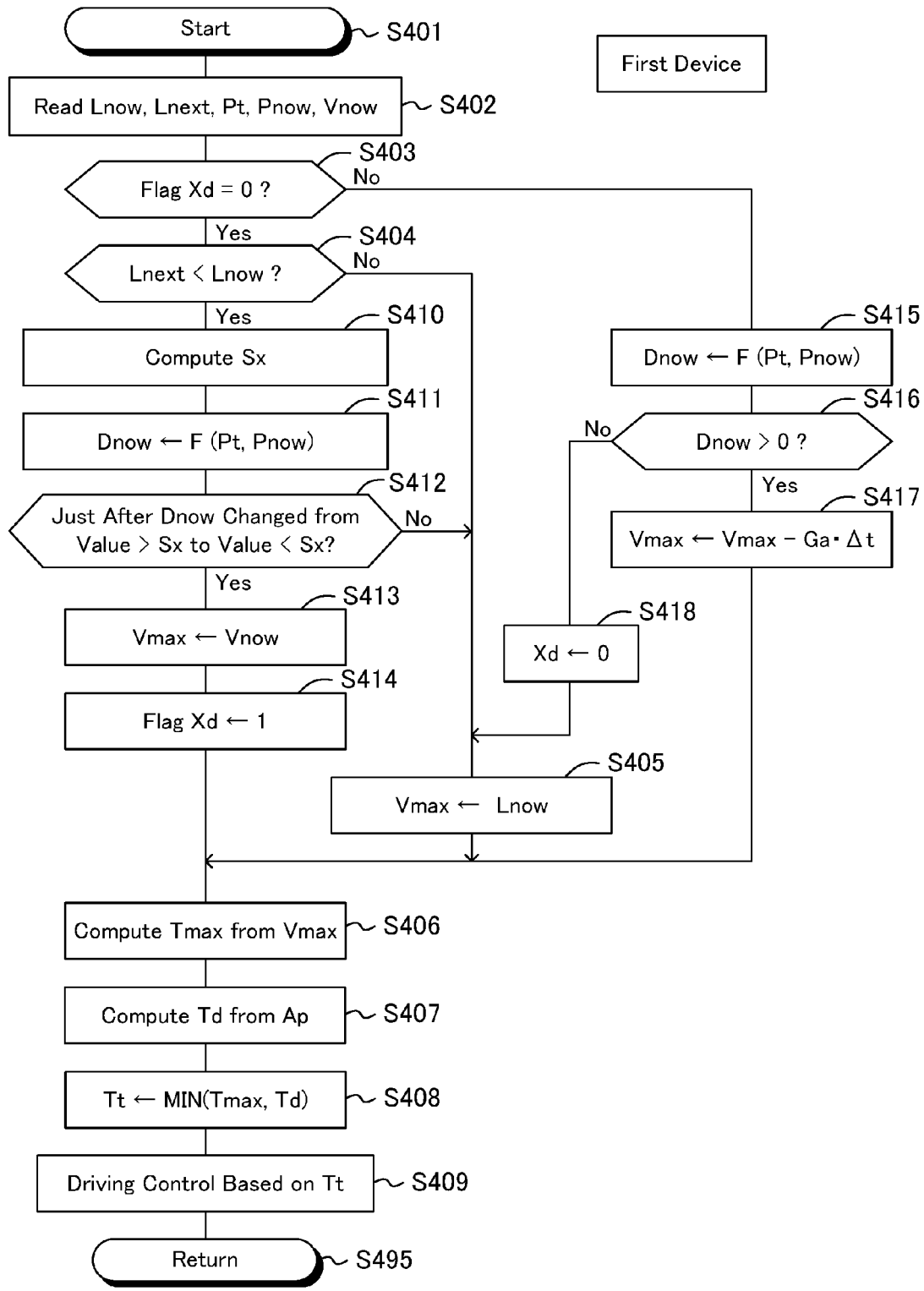
FIG. 4 is a flowchart for showing a routine which a CPU of the first device performs.

Thereafter, when the own-vehicle continues running and arrives at the switch starting point Ps, decrease in the upper speed limit Vmax is started and, as a result, the value of the decelerating flag Xd is changed from "0" to "1" (refer to step S414 in FIG. 4.).

In this case, the CPU judges at step S902 in FIG. 9 as "Yes" and progresses to step S906, and judges whether the present time point is the "time point immediately after the value of the decelerating flag Xd is changed from "0" to "1." Then, the CPU judges also at this step S906 as "Yes", performs processing at step S907 to step S909, which will be described below, in order, and thereafter progresses to step S995 and once ends this routine.

Step S907: The CPU generates comparatively loud sound (sound which indicates that decrease in the upper speed limit Vmax is started) from a speaker device of the notification device 60 (refer to an "illustration SP1 of a speaker with a large size" in (D) of FIG. 10). In this case, the CPU may generate a message purporting that decrease in the upper speed limit Vmax is started with sound or voice.

Step S908: The CPU indicates the present speed limit Lnow in the display area DA of the notification device 60.

Step S909: The CPU indicates the upper speed limit Vmax at the present time point in the display area DB of the notification device 60.

In this state, when the CPU starts the routine in FIG. 9 again, the CPU judges at step S902 as "Yes", and judges at step S906 as "No." Then, the CPU progresses to step S910, and judges whether the upper speed limit Vmax is decreased by constant speed (for example, 5 km/h) as compared with that at a time point when the value of the decelerating flag Xd is changed from "0" to "1", or as compared with that at a time point when the indication of the upper speed limit Vmax in the display area DB is changed last time. When this judgment condition at step S910 is not satisfied, the CPU judges at that step S910 as "No", and progresses to step S995 directly and once ends this routine.

On the contrary, when the judgment condition at step S910 is satisfied, the CPU judges at that step S910 as "Yes", performs processing at step S911 to step S913, which will be described below, in order, and thereafter progresses to step S995 and once ends this routine.

Step S911: The CPU generates comparatively faint sound (sound which indicates that decrease in the upper speed limit Vmax is continuing) from a speaker device of the notification device 60 (refer to "illustrations SP2 to SP4 of a speaker with a small size" in (D) of FIG. 10).

Step S912: The CPU indicates, in the display area DA, the present speed limit Lnow, the next speed limit Lnext and an arrow mark oriented from the present speed limit Lnow to the next speed limit Lnext, and indicates the pre-transition distance Dnow on the bottom thereof (refer to (P2) and (P3) in (C) of FIG. 10).

Step S913: The CPU indicates the upper speed limit Vmax at the present time point in the display area DB in a blinking manner. For example, supposing that the upper speed limit Vmax is 95 km/h when the own-vehicle arrives at the point P2 as shown in FIG. 10, "95 km/h" is indicated in a blinking manner in the display area DB (refer to (P2) in (C) of FIG. 10). Furthermore, for example, supposing that the upper speed limit Vmax is 85 km/h when the own-vehicle arrives at the point P3, "85 km/h" is indicated in a blinking manner in the display area DB (refer to (P3) in (C) of FIG. 10).

Furthermore, when the own-vehicle continues running and arrives at the transition point Pt, the value of the decelerating flag Xd is changed from "1" to "0" (refer to step S418 in FIG. 4). In this case, the CPU judges at step S902 as "No", judges at step S903 as "Yes", and progresses to step S914, and generates comparatively loud sound (sound which indicates that decrease in the upper speed limit Vmax has been completed) from a speaker device of the notification device 60 (refer to an "illustration SP5 of a speaker with a large size" in (D) of FIG. 10). In this case, the CPU may generate a message purporting that decrease in the upper speed limit Vmax has been completed with sound or voice. Thereafter, the CPU performs processing at step S904 and step 905. As a result, an indication of "80 km/h" which is the present speed limit Lnow after switching (namely, the next speed limit Lnext until now) is indicated in the display area DA, and an indication of "80 km/h" which is the upper speed limit Vmax at the present time point is indicated in the display area DB (refer to (P4) in (C) of FIG. 10.

Thus, in accordance with the fourth device, a driver can be notified that the upper speed limit Vmax is decreased before the own-vehicle goes into a region (Rnext) for which a lower speed limit (Lnext) is set. As a result, since the driver can recognize that the own-vehicle slows down, it can be avoided that the driver feels a sense of incongruity, for example.

Fifth Embodiment

By the way, the above-mentioned fourth device notifies a driver that the upper speed limit Vmax is decreased before the own-vehicle goes into the region (Rnext) for which the lower speed limit (Lnext) is set. In this case, when the driver judges that the own-vehicle should not be slowed down, for example, based on a running state of the own-vehicle and a traffic situation around the own-vehicle, etc., the driver may wish to maintain the vehicle speed of the own-vehicle without decreasing the upper speed limit Vmax.

Then, a vehicle control device according to a fifth embodiment of the present invention (which may be referred to as a "fifth device" hereafter) forbids (cancels) that the upper speed limit Vmax is decreased before the own-vehicle goes into the region (Rnext) where the lower speed limit (Lnext) is set, when a driver performs a predetermined operation (cancel operation) to the operation part 31.

The cancel operation in this example is an operation in which a control lever 31 as shown in FIG. 14 is depressed downward in a vertical direction (refer to a black-lacquered arrow). The fifth device is different from the fourth device only in a point that the CPU of the ECU 40 thereof performs an assistance routine shown in FIG. 11 in place of FIG. 4 whenever an operation period Δt passes, and in a point that the CPU respectively performs routines shown in FIG. 12 and FIG. 13 whenever the operation period Δt passes. Therefore, these differences will be explained with a focus thereon hereafter.

(Operation)

Figure 11:
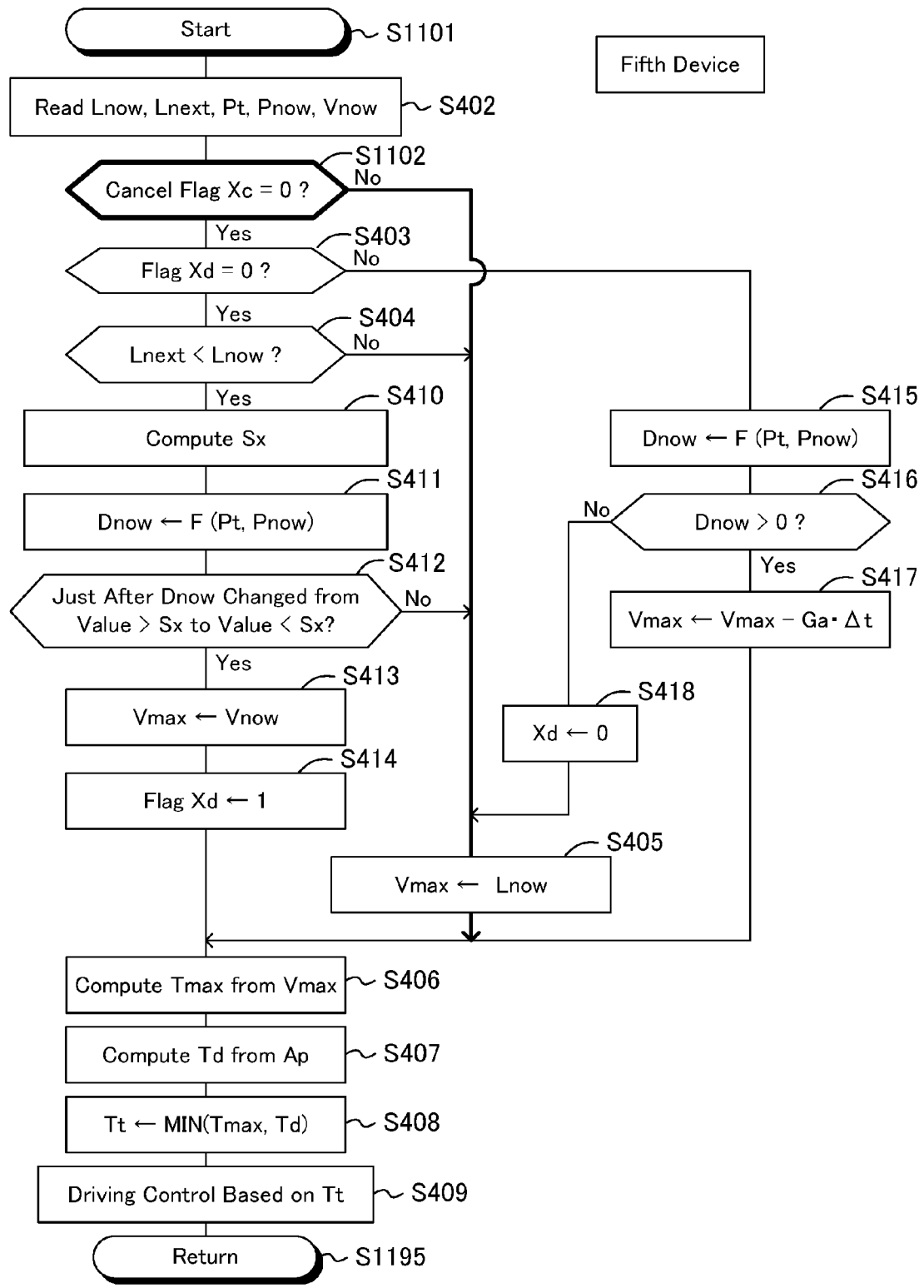
FIG. 11 is a flowchart for showing a routine which a CPU of a vehicle control device according to a fifth embodiment of the present invention (fifth device) performs.

The routine in FIG. 11 is different from the routine in FIG. 4, only in a point that step S1102 is prepared between step S402 and step S403. More specifically, when the CPU progresses to step S1102 following step S402, the CPU judges whether a value of a cancel flag Xc is "0." It is configured so that a value of this cancel flag is also set to "0" in the above-mentioned initial routine. Furthermore, the value of the cancel flag Xc is operated by the routines in FIG. 12 and FIG. 13, which will be mentioned later.

When the value of the cancel flag Xc is "0", the CPU judges at step S1102 as "Yes" and progresses to step S403. On the contrary, when the value of the cancel flag Xc is not "0", thee CPU judges at step S1102 as "No" and progresses to step S405. Therefore, in this case, the upper speed limit Vmax is set to the present speed limit Lnow regardless of the value of the decelerating flag Xd.

Figure 12:
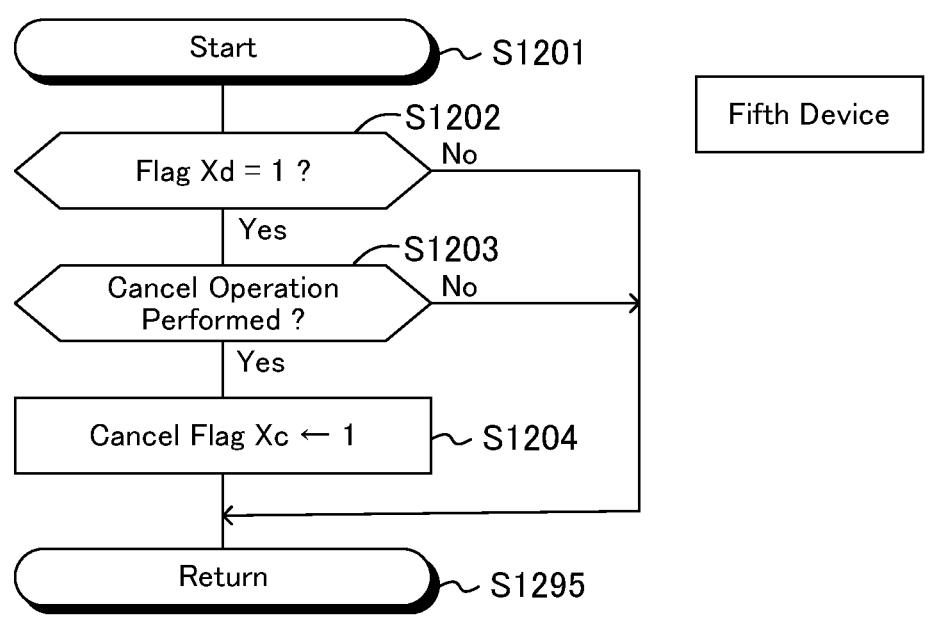
FIG. 12 is a flowchart for showing a routine which the CPU of the fifth device performs.

On the other hand, after starting processing from step S1201 in FIG. 12, the CPU progresses to step S1202, and judges whether the value of the decelerating flag Xd is "1." Namely, the CPU judges whether the upper speed limit Vmax has been decreased before the own-vehicle goes into the region (Rnext) where the lower speed limit (Lnext) is set.

When the value of the decelerating flag Xd is "1", the CPU judges at step S1202 as "Yes" and progresses to step S1203, and judges whether the cancel operation has been performed. At this time, when the cancel operation using the control lever 31 has occurred, the CPU judges at step S1203 as "Yes" and progresses to step S1204, and sets the value of the cancel flag Xc to "1." Thereafter, the CPU progresses to step S1295 and once ends this routine.

On the contrary, when the value of the decelerating flag Xd is "0", the CPU judges at step S1202 as "No", and progresses to step S1295 directly and once ends this routine.

Furthermore, when there is no cancel operation, the CPU judges at step S1203 as "No", and progresses to step S1295 directly and once ends this routine.

Figure 13:
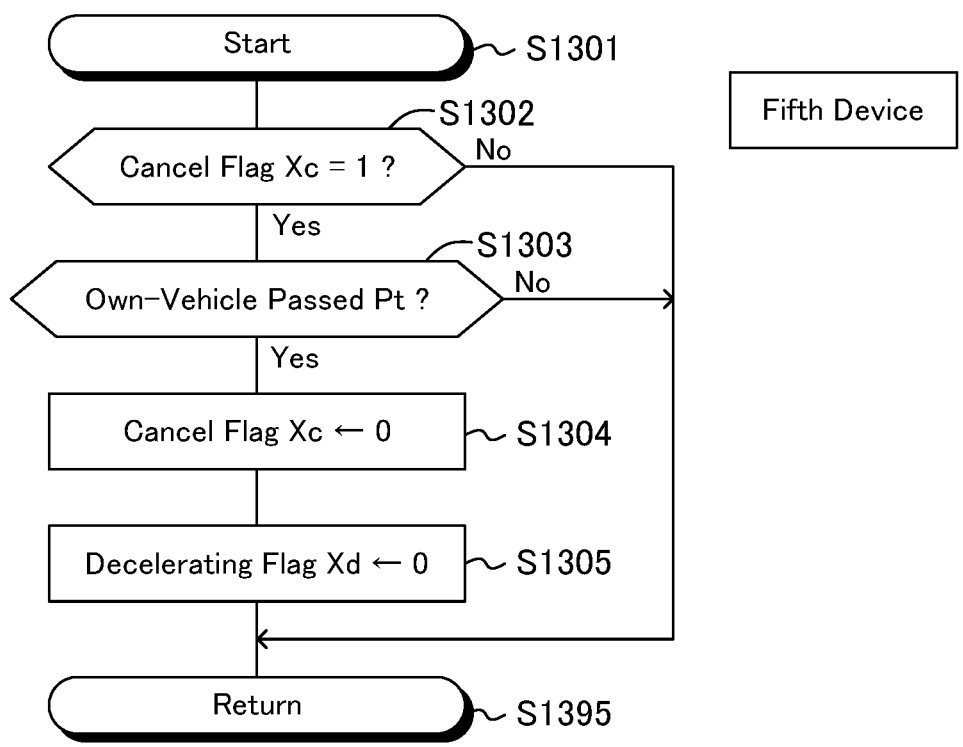
FIG. 13 is a flowchart for showing a routine which the CPU of the fifth device performs.

On the other hand, after starting processing from step S1301 of FIG. 13, the CPU progresses to step S1302, and judges whether the value of the cancel flag Xc is "1." When the value of the cancel flag Xc is "1", the CPU judges at step S1302 as "Yes" and progresses to step S1303, and judges whether the own-vehicle has passed through the transition point Pt based on the present own-vehicle position Pnow and the transition point Pt. When the own-vehicle has passed through the transition point Pt, the CPU judges at step S1302 as "Yes" and performs processing at step S1304 and step S1305, which will be described below, in order, and progresses to step S1395 and once ends this routine.

Step S1304: The CPU sets the value of the cancel flag Xc to "0" (clears the cancel flag Xc).

Step S1305: The CPU sets the value of the decelerating flag Xd to "0" (clears the decelerating flag Xd).

On the contrary, when the value of the cancel flag Xc is "0", the CPU judges at step S1302 as "No", and progresses to step S1395 directly and once ends this routine. Furthermore, when the own-vehicle has not passed through the transition point Pt, the CPU judges at step S1303 as "No", and progresses to step S1395 directly and once ends this routine.

As understood from the above, the fourth device decreases the upper speed limit before the own-vehicle goes into the region where the lower speed limit is set, and notifies a driver that the upper speed limit is decreased (as a result, the own-vehicle is slowed down). Furthermore, when the intention which does not desire a degradation of the upper speed limit when the driver expresses an intention that the driver does not wish to decrease the upper speed limit by operating the control lever 31, the fourth device maintains the upper speed limit at the present speed limit. Accordingly, it becomes possible for the driver to maintain the vehicle speed of the own-vehicle or to accelerate the own-vehicle within the limits of the upper-limit vehicle speed.

The above-mentioned cancel operation is not limited to an operation of the control lever 31. For example, the cancel operation may be an operation in which an accelerator pedal is stepped on (trodden) by a predetermined amount (for example, 10%) or more within an accelerator within unit time. This cancel operation is detected by monitoring whether the amount of change of the accelerator operation amount Ap per unit time is a threshold or more. Furthermore, vehicle speed limiting control by the upper-limit vehicle speed Vmax itself (namely, the entire ISA function) may be canceled by an operation in which an accelerator pedal is stepped on (trodden) to an ON position of a kickdown switch (SW).

The present invention is not limited to the above-mentioned embodiments, and can adopt various modifications within the scope of the present invention. For example, the first device decreases the vehicle speed toward the next speed limit Lnext by gradually decreasing the upper-limit vehicle speed Vmax at the deceleration Ga from the time point when the own-vehicle arrives at the switch starting point Ps. Instead of this, while immediately changing the upper-limit vehicle speed Vmax to the next speed limit Lnext from the time point when own-vehicle arrives at the switch starting point Ps, the vehicle speed may be gradually decreased at the deceleration G included in the acceptable deceleration range in a period from that time point until the own-vehicle arrives at the transition point Pt.

Furthermore, in each of the embodiments, when the speed limit L can be acquired with the imaging device 22, the speed limit L acquired by the imaging device 22 may be accumulated (stored) in the navigation device 21, in association with the corresponding region R in the map information stored in the navigation device 21. However, the configuration of the speed limit acquisition part 20 is not particularly limited as long as it is possible to acquire the speed limit L set for the road.

Furthermore, when performing the indication shown in FIG. 10, an "indication for showing a cancel operation" as shown in FIG. 14 may be indicated on a display along with the indication.

REFERENCE SIGNS LIST

10: Vehicle control device, 20: Speed limit acquisition means, 21: Navigation device, 22: Imaging device, 30: Detection part, 31: Operation part, 32: Vehicle speed sensor, 33: Accelerator operation amount sensor, 40: Vehicle assistance ECU, 41: Upper speed limit setting part, 42: Driving force adjusting part, 42a: Upper-limit driving-force calculation part, 42b: Demand driving-force calculation part, 42c: Driving-force determination part, 43: Information notification part, 50: Driving device, and 60: Notification device.

What is claimed is:

1. A vehicle control device comprising;
a speed limit acquisition means configured to acquire a speed limit set for a road on a traveling route of an own-vehicle,
a vehicle speed acquisition means configured to acquire a vehicle speed which is a running speed of the own-vehicle, and
a vehicle speed control means configured to:
set an upper speed limit based on the speed limit and control the vehicle speed so that the vehicle speed does not become the upper speed limit or higher,
decrease the vehicle speed so that the vehicle speed approaches a next speed limit from a time point when it is judged that a position of the own-vehicle is at a predetermined position in front of a transition point which is a point where the next speed limit starts to be applied, in a case where a specified condition that the next speed limit is lower than a present speed limit is satisfied, wherein the present speed limit is a speed limit set for a road on which the own-vehicle is running at a present time point, and the next speed limit is a following speed limit set for a road on the traveling route,
decrease the vehicle speed so that the vehicle speed approaches the next speed limit by gradually decreasing the upper speed limit toward the next speed limit from the time point when it is judged that the position of the own-vehicle is at the predetermined position, in a case where the specified condition is satisfied,
compute a longest deceleration distance which is a distance required for decreasing the vehicle speed at the present time point to the next speed limit lower than the present speed limit at a minimum deceleration included in a predetermined acceptable deceleration range,
judge that the position of the own-vehicle is not the predetermined position, when a pre-transition distance which is a distance from the position of the own-vehicle to the transition point is longer than the longest deceleration distance, and judge that the position of the own-vehicle is the predetermined position, when the pre-transition distance is the longest deceleration distance or less.

2. The vehicle control device according to claim 1, wherein:
the vehicle speed control means is further configured to;
compute the longest deceleration distance which is a distance required for decreasing the vehicle speed at the present time point to the next speed limit lower than the present speed limit at the minimum deceleration included in a predetermined acceptable deceleration range,
compute the shortest deceleration distance which is a distance required for decreasing the vehicle speed at the present time point to the next speed limit at the maximum deceleration included in the acceptable deceleration range,
judge that the position of the own-vehicle is not the predetermined position, when a pre-transition distance which is a distance from the position of the own-vehicle to the transition point is longer than the longest deceleration distance, and
judge that the position of the own-vehicle is the predetermined position and gradually decrease the upper speed limit at a predetermined deceleration included in the acceptable deceleration range so that vehicle speed of the own-vehicle when the position of the own-vehicle reaches the transition point becomes identical to the next speed limit, when the pre-transition distance is the longest deceleration distance or less and the pre-transition distance is the shortest deceleration distance or more.

3. The vehicle control device according to claim 2, wherein:
the vehicle speed control means is configured to judge that the position of the own-vehicle is the predetermined position and decrease the upper speed limit at the maximum deceleration, also when the pre-transition distance is less than the shortest deceleration distance.

4. The vehicle control device according to claim 3, further comprising:
a vehicle speed excess notification means configured to give a driver a vehicle speed excess notice which is a notice that there is a possibility that vehicle speed of the own-vehicle when the position of the own-vehicle reaches the transition point may be higher than the next speed limit, when the pre-transition distance is less than the shortest deceleration distance.

5. The vehicle control device according to claim 3, further comprising:
an upper speed limit decrease notification means configured to give a driver an upper speed limit decrease notice which is a notice that the upper speed limit is decreased when the specified condition is satisfied and the upper speed limit is decreased.

6. The vehicle control device according to claim 2, further comprising:
an upper speed limit decrease notification means configured to give a driver an upper speed limit decrease notice which is a notice that the upper speed limit is decreased when the specified condition is satisfied and the upper speed limit is decreased.

7. The vehicle control device according to claim 1, further comprising:
an upper speed limit decrease notification means configured to give a driver an upper speed limit decrease notice which is a notice that the upper speed limit is decreased when the specified condition is satisfied and the upper speed limit is decreased.

8. The vehicle control device according to claim 7, wherein:
the vehicle speed control means is configured to cancel that the upper speed limit is decreased when a predetermined cancel operation is performed after the upper speed limit decrease notification has been performed.

9. A vehicle control device, wherein the vehicle control device
acquires a speed limit set for a road on a traveling route of an own-vehicle, and
acquires a vehicle speed that is a running speed of the own-vehicle,
wherein the vehicle control device includes a controller configured to:
set an upper speed limit based on the acquired speed limit and control the vehicle speed so that the vehicle speed does not become the upper speed limit or higher,
decrease the vehicle speed so that the vehicle speed approaches a next speed limit from a time point when it is judged that a position of the own-vehicle is at a predetermined position in front of a transition point which is a point where the next speed limit starts to be applied, in a case where a specified condition that the next speed limit is lower than a present speed limit is satisfied, wherein the present speed limit is a speed limit set for a road on which the own-vehicle is running at a present time point, and the next speed limit is a following speed limit set for a road on the traveling route,
decrease the vehicle speed so that the vehicle speed approaches the next speed limit by gradually decreasing the upper speed limit toward the next speed limit from the time point when it is judged that the position of the own-vehicle is at the predetermined position, in a case where the specified condition is satisfied,
compute a longest deceleration distance which is a distance required for decreasing the vehicle speed at the present time point to the next speed limit lower than the present speed limit at a minimum deceleration included in a predetermined acceptable deceleration range,
judge that the position of the own-vehicle is not the predetermined position, when a pre-transition distance which is a distance from the position of the own-vehicle to the transition point is longer than the longest deceleration distance, and
judge that the position of the own-vehicle is the predetermined position, when the pre-transition distance is the longest deceleration distance or less.

10. A vehicle control device comprising;
a navigation device and an imaging device for acquiring a speed limit set for a road on a traveling route of an own-vehicle,
a vehicle speed acquisition sensor for acquiring a vehicle speed which is a running speed of the own-vehicle, and
a controller configured to:
set an upper speed limit based on the acquired speed limit and control the vehicle speed so that the vehicle speed does not become the upper speed limit or higher,
decrease the vehicle speed so that the vehicle speed approaches a next speed limit from a time point when it is judged that a position of the own-vehicle is at a predetermined position in front of a transition point which is a point where the next speed limit starts to be applied, in a case where a specified condition that the next speed limit is lower than a present speed limit is satisfied, wherein the present speed limit is a speed limit set for a road on which the own-vehicle is running at a present time point, and the next speed limit is a following speed limit set for a road on the traveling route, decrease the vehicle speed so that the vehicle speed approaches the next speed limit by gradually decreasing the upper speed limit toward the next speed limit from the time point when it is judged that the position of the own-vehicle is at the predetermined position, in a case where the specified condition is satisfied, compute a longest deceleration distance which is a distance required for decreasing the vehicle speed at the present time point to the next speed limit lower than the present speed limit at a minimum deceleration included in a predetermined acceptable deceleration range, judge that the position of the own-vehicle is not the predetermined position, when a pre-transition distance which is a distance from the position of the own-vehicle to the transition point is longer than the longest deceleration distance, and judge that the position of the own-vehicle is the predetermined position, when the pre-transition distance is the longest deceleration distance or less.

* * * * *